(12) United States Patent
Abhigyan et al.

(10) Patent No.: US 11,140,081 B2
(45) Date of Patent: Oct. 5, 2021

(54) EXTENDING DISTRIBUTED HASH TABLE-BASED SOFTWARE NETWORK FUNCTIONS TO SWITCHING HARDWARE

(71) Applicant: AT&T Intellectual Property I, L.P., Atlanta, GA (US)

(72) Inventors: Abhigyan, Newark, NJ (US); Kaustubh Joshi, Scotch Plains, NJ (US); Han Nguyen, Marlboro, NJ (US); Edward Daniels, Wadsworth, OH (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 57 days.

(21) Appl. No.: 16/589,387

(22) Filed: Oct. 1, 2019

(65) Prior Publication Data
US 2021/0099388 A1    Apr. 1, 2021

(51) Int. Cl.
*H04L 12/803* (2013.01)
*H04L 29/08* (2006.01)
*H04L 12/771* (2013.01)

(52) U.S. Cl.
CPC ............ *H04L 47/125* (2013.01); *H04L 45/56* (2013.01); *H04L 67/1053* (2013.01); *H04L 67/1065* (2013.01); *H04L 67/2842* (2013.01)

(58) Field of Classification Search
None
See application file for complete search history.

(56) References Cited

U.S. PATENT DOCUMENTS

| | | | |
|---|---|---|---|
| 6,633,565 B1 * | 10/2003 | Bronstein | ........... H04L 49/3009 370/392 |
| 9,729,444 B2 | 8/2017 | Wells | |
| 2014/0310418 A1 * | 10/2014 | Sorenson, III | ...... H04L 67/1002 709/226 |
| 2017/0168958 A1 * | 6/2017 | van Greunen | .......... G06F 12/12 |

OTHER PUBLICATIONS

Jin et al., "NetCache: Balancing Key-Value Stores with Fast In-Network Caching," Proceedings of SOSP '17, Oct. 28, 2017, 2017 Association for Computing Machinery.

* cited by examiner

*Primary Examiner* — Jason E Mattis
*Assistant Examiner* — Hong Shao
(74) *Attorney, Agent, or Firm* — Hartman & Citrin LLC

(57) ABSTRACT

According to one aspect disclosed herein, a system can include a set of node peers, including a first subset implemented in software and a second subset implemented in hardware. The first subset can include a software node. The second subset can include a hardware node that includes a hardware cache, a processor, and a memory that stores computer-executable instructions. The hardware node can receive, from a network, a packet, and can determine if data that identifies a path associated with the packet is stored in the hardware cache. If not, the hardware node can query the software node to identify the path associated with the packet, and can receive, in response from the software node, the data that identifies the path, which then can be stored in the hardware cache. The hardware node can forward, along the path, the packet to a network element.

17 Claims, 27 Drawing Sheets

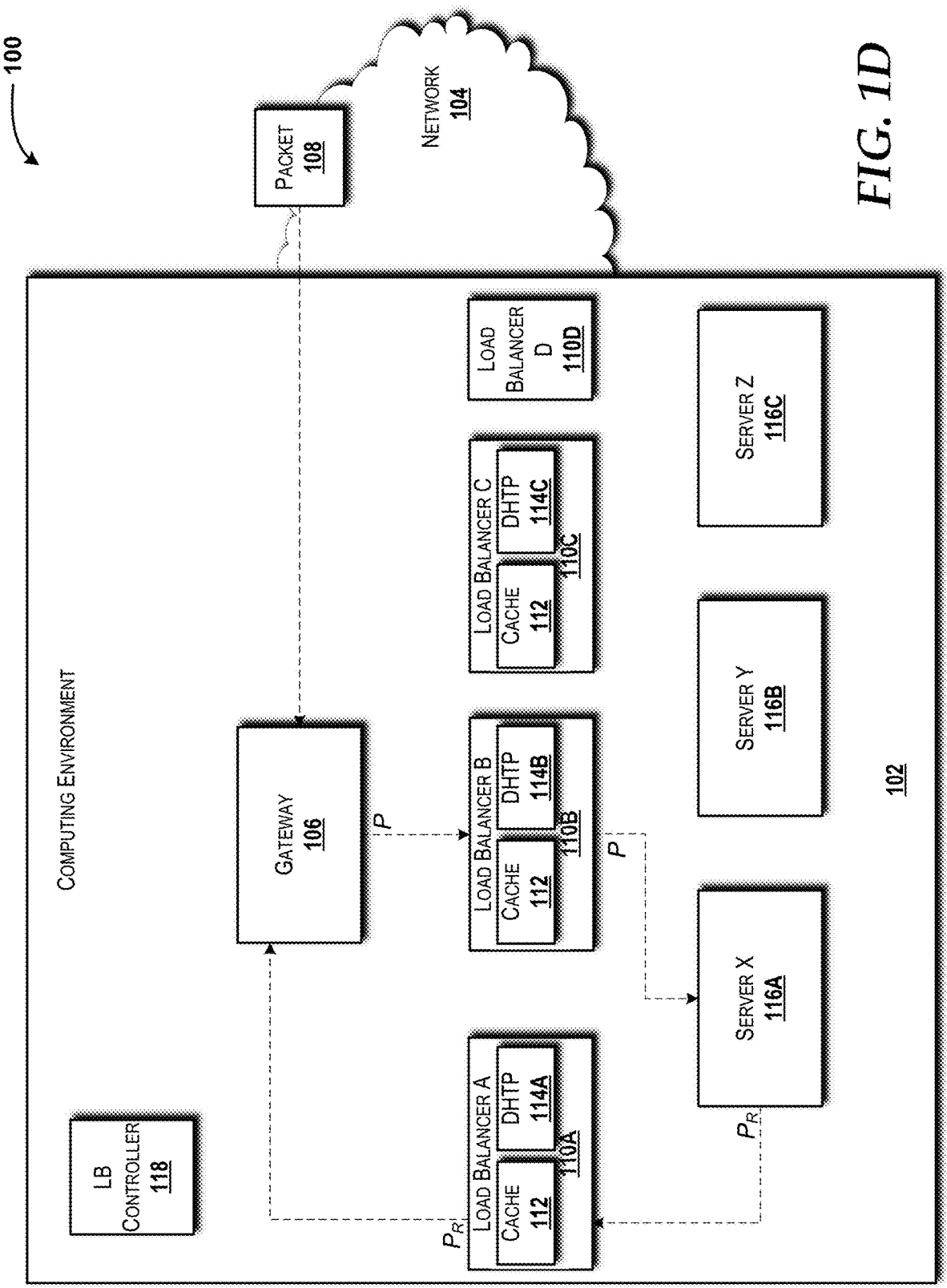

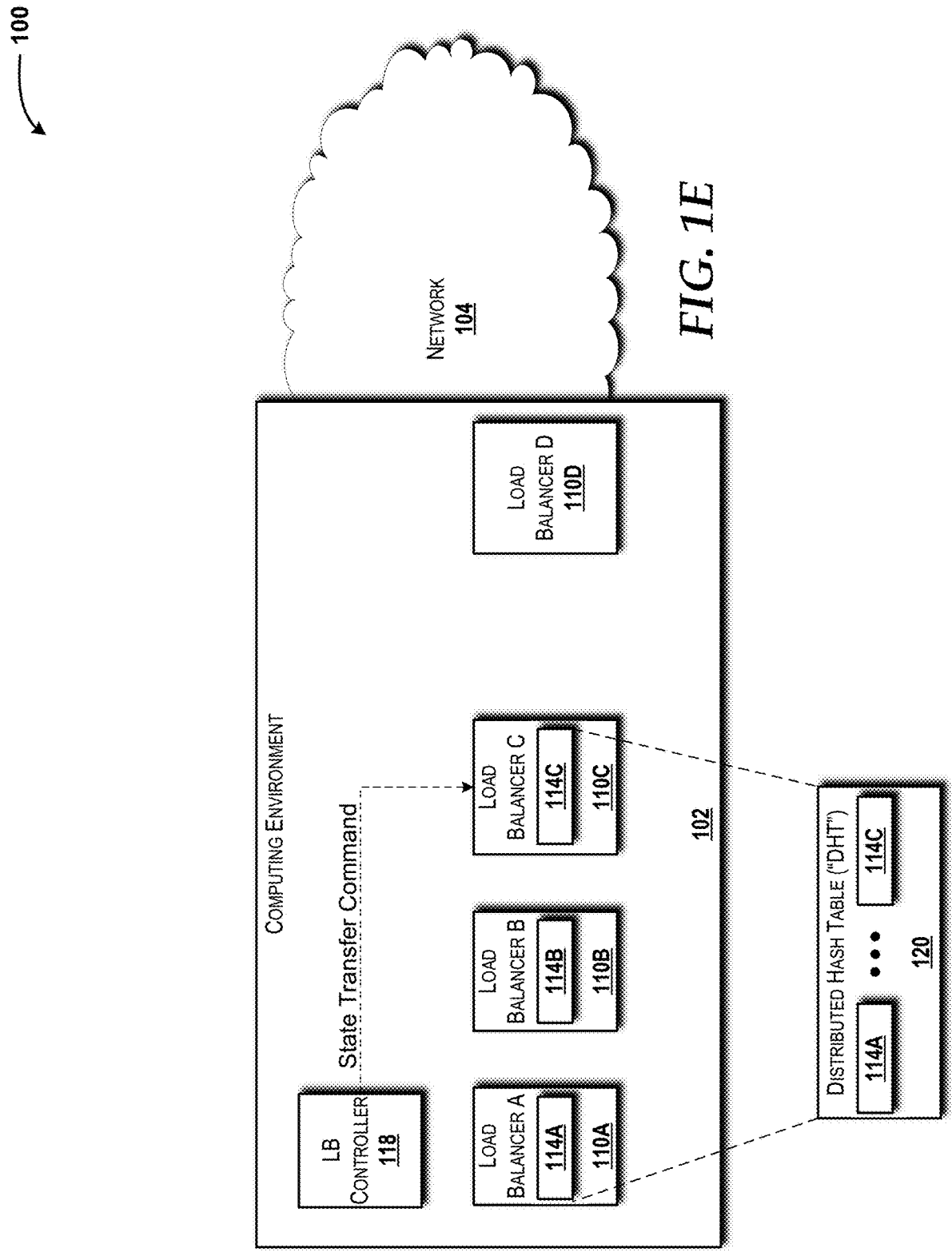

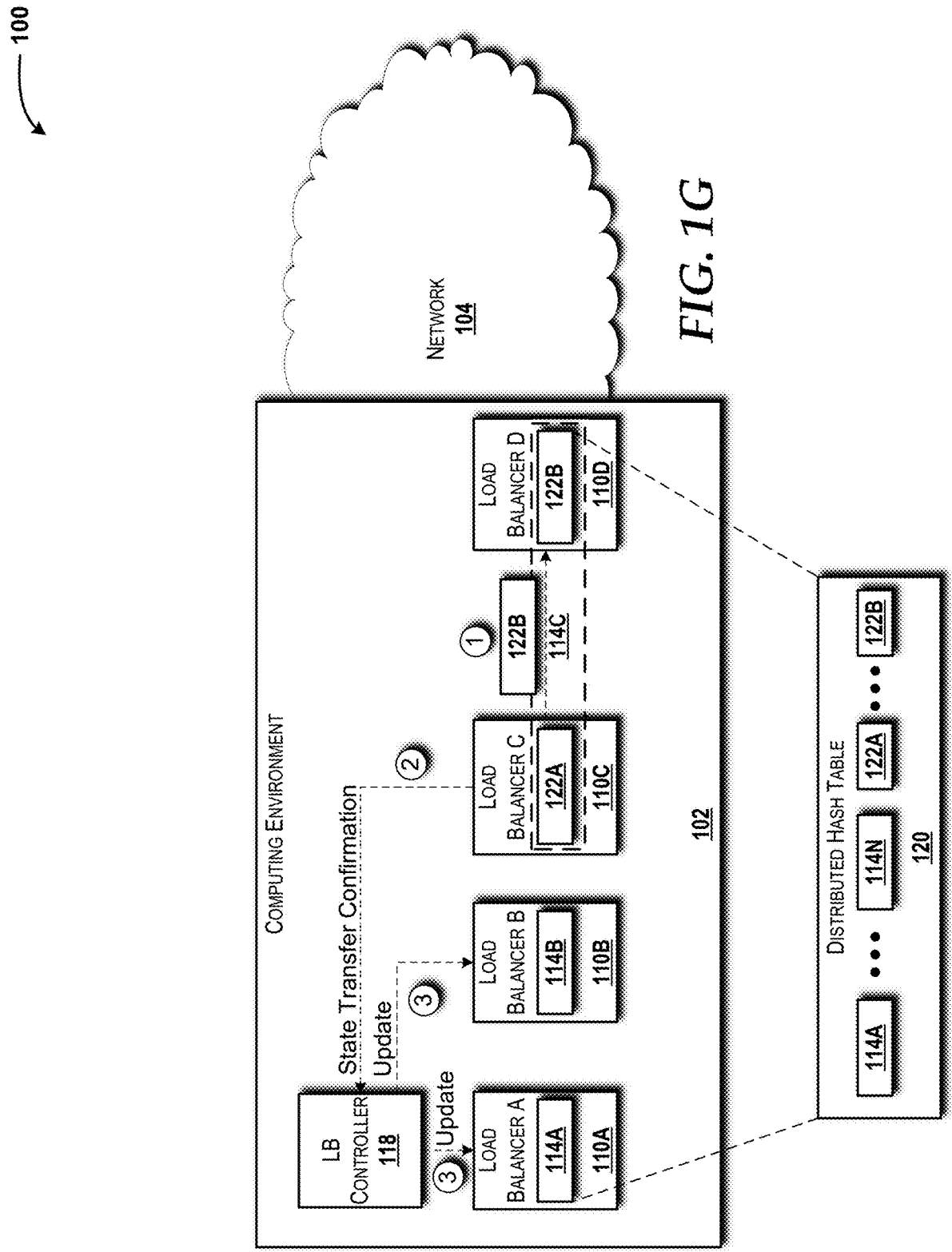

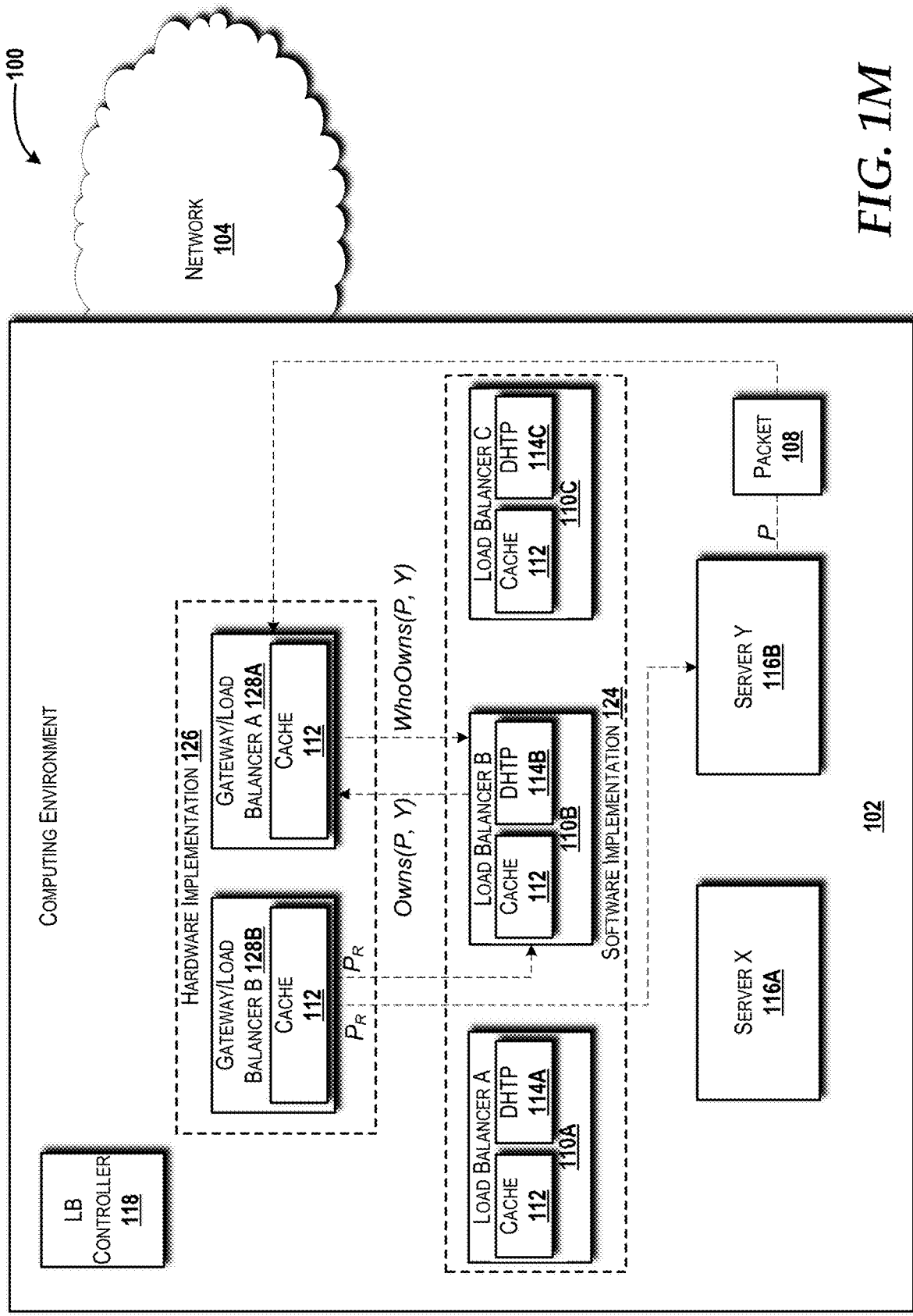

EXTENDING DISTRIBUTED HASH TABLE-BASED SOFTWARE NETWORK FUNCTIONS TO SWITCHING HARDWARE

BACKGROUND

Network data plane hardware and software can be characterized as either stateful or stateless. An element may be referred to as being "stateful" if the element maintains state associated with an individual data flow such as, for example, a connection established using transmission control protocol ("a TCP connection"). A stateful element such as, for example, a firewall, must observe all packets of single data flow in both forward and reverse directions to ensure that the element will operate correctly. Thus, stateful elements require flow affinity to be preserved. Preserving flow affinity, however, can be difficult in a distributed and/or elastically scaled computing environment.

A stateless network element that replaces a distributed stateful element may not preserve flow affinity in both directions of the flow. Similarly, if a stateless element is replaced with a stateful element, flow affinity in the forward direction may be disrupted when the element is added or removed. Still further scaling of stateful elements (e.g., introducing a new instance of a stateful element) can disrupt flows and/or flow affinity. Thus, one challenge in distributed computing environments is the task of interconnecting stateless and stateful network elements in a manner that preserves data flow affinity. With the growing trend including virtualization of stateful network functions such as, for example, firewalls, network address translation ("NAT") devices, and the like, this challenge can be more pronounced. Stateful virtual network functions may be required to operate, communicate, and/or otherwise interact with stateless networking devices and/or hardware, and there may be no way to preserve flow affinity in such environments.

In some cases, a gateway or other centralized device can store a flow table. A flow table can include entries for each flow path (e.g., keyed on a hash value generated based on packet headers). Such a flow table can require an entry for each traffic flow and therefore can be large and expensive (in terms of resource usage) to maintain and/or query. Thus, the use of centralized flow tables can be inefficient and may not be practical for distributed computing environments.

Hardware and software each has its unique advantage for implementing network functions. Hardware can achieve a high forwarding capacity of terabits of data with a single node but is limited in the size of flow table it can store. Software can store very large flow tables with billions of entries but has much smaller forwarding capacity of tens of gigabits per second.

SUMMARY

The concepts and technologies disclosed herein are directed, in part, to providing stateful network functions, such as, but not limited to, load balancers, that are fault tolerant, elastically scalable, and flow affinity preserving even when replacing and/or interacting with stateless network elements. Thus, embodiments of the concepts and technologies disclosed herein can enable interconnection of stateless and stateful elements while preserving the flow affinity for stateful elements. In some embodiments, a load balancer and/or data plane forwarder (hereinafter referred to as a "load balancer") can be introduced between stateless and stateful network elements. The load balancer can store mappings between flow identifiers (e.g., unique hashes of the source IP address, the destination IP address, the source port, the destination port, and the protocol) and an instance of a stateful network element that must receive all packets for this flow. According to various embodiments of the concepts and technologies disclosed herein, embodiments support scalability. Namely, the mappings can be maintained in a distributed hash table that can be spread across a set of load balancers.

A load balancer, or other stateful network function, that receives a packet of a data flow can be configured to identify a load balancer that maintains an associated portion of the distributed hash table based on the flow identifier. The load balancer can query the identified load balancer. The identified load balancer can determine, based on its portion of the distributed hash table, which instance of the stateful element should receive the forwarded packet. This information can be provided to the requesting load balancer. For efficiency, the requesting load balancer can cache the response from the distributed hash table to avoid lookups of the distributed hash table for the subsequent packets of this flow.

A load balancer, or other stateful network function, that receives the packet from a gateway can determine, based on a hash value associated with the packet, a load balancer to query for path/flow information and/or ownership information (if the load balancer that receives the packet does not store path/flow information for the packet). The load balancer can query the load balancer identified and receive a response with the path and/or ownership information. Based on the received information, the load balancer can forward the packet to an endpoint (e.g., next router or another stateful network function) as identified. The load balancer that receives the response also can be configured to generate an entry for its distributed hash table portion, where the entry can identify the path, ownership and/or endpoint associated with the path. Thus, when a subsequent packet is received by the same load balancer (that generated the query), the load balancer can determine the path associated with the subsequent packet without querying another load balancer.

In the event of a scale event (e.g., adding another node of load balancing functionality and/or of servers of the computing environment), the load balancers can be configured to maintain flow affinity. In particular, if a new instance of the load balancing functionality is introduced to the computing environment, e.g., a new load balancer is added to the computing environment, a load balancer controller can be configured to redistribute and/or re-divide the distributed hash table across the load balancers and to update hash value ranges maintained by the load balancers. According to various embodiments of the concepts and technologies disclosed herein, the load balancer controller can be configured to generate a state transfer command and to send the state transfer command to one of the load balancers that is to offload some portion of its distributed hash table portion to the new load balancer. The load balancer controller can send the state transfer command to the load balancer and in response to receiving the state transfer command, the load balancer that receives the state transfer command can divide its associated distributed hash table portion into the two or more sub-portions. It can be appreciated that the two or more sub-portions can include at least the same data as was included in the distributed hash table portion. The load balancer also can be configured to transfer one of the sub-portions to the new load balancer that has been introduced to the computing environment.

The load balancer, or other stateful network function, can transmit, to the new load balancer, or other new stateful network function, one of the sub-portions and can retain another of the sub-portions. After transfer of the sub-portion to the new load balancer is completed, the load balancer can send a state transfer confirmation or other message to the load balancer controller to inform the load balancer controller that the state transfer is complete. The load balancer can be configured to send updates to the other load balancers to update the key ranges associated with the multiple distributed hash table portions. Thus, the load balancers can be updated to query the new load balancer if a packet with an associated hash value that is in a range of the sub-portion is received.

The aforementioned concepts and technologies provide a distributed software-based load balancer that stores table entries in a distributed fashion among load balancer nodes. Any node can query the entry for any connection from another node and cache it locally. These concepts and technologies are extended herein to treat a hardware node similar to an additional software node to best utilize the capabilities of hardware and software for implementing stateful network functions. As described herein, a hardware node can use the same protocol and can support the same operations as its software node counterpart, but, the hardware node can only cache entries that are backed up by at least one entry stored in the software node. A benefit of this is that the traffic load on software load balancers is dramatically reduced. In some cases, most of the traffic bypasses the software load balancers. If the hardware cannot cache a flow (e.g., due to lack of space in a flow table), the distributed software load balancer, such as described above, can seamlessly absorb additional load. By using the same distributed protocol as a software load balancer, this design is arguably a simpler, more elegant design.

According to one aspect of the concepts and technologies disclosed herein, a system is disclosed. The system can include a set of node peers, wherein a first subset of the set of node peers is implemented in software and a second subset of the set of node peers is implemented in hardware. The first subset can include a software node that includes a first portion of a distributed hash table and a software cache. The second subset can include a hardware node. The hardware node can include a hardware cache, a processor, and a memory that stores computer-executable instructions that, when executed by the processor, cause the processor to perform operations. The operations can include receiving, from a network, a packet. The operations further can include determining if data that identifies a path associated with the packet is stored in the hardware cache. The operations can further include in response to determining that the data that identifies the path associated with the packet is not stored in the hardware cache, querying the software node to identify the path associated with the packet. The operations can further include receiving, from the software node, the data that identifies the path; storing, in the hardware cache, the data that identifies the path; and forwarding, along the path, the packet to a network element such as, but not limited to, a server.

In some embodiments, the computer-executable instructions, when executed by the processor, cause the processor to perform operations that further can include receiving, from the network, a subsequent packet. The operations can further include determining, based on the hardware cache, the path associated with the subsequent packet. The operations can further include forwarding the subsequent packet directly to the network element, and therefore bypassing the first subset of the set of node peers.

In some embodiments, the computer-executable instructions, when executed by the processor, cause the processor to perform operations that further can include receiving, from the network element, a subsequent packet on a reverse path. The network elements can send the subsequent packet in response to the packet. The operations can further include forwarding the subsequent packet to the network.

In some embodiments, the second subset of the set of node peers can include a further hardware node that includes a further hardware cache. In some embodiments, the first subset of the set of node peers can include a further software node that includes a second portion of the distributed hash table and a further software cache. In some embodiments, the software node can include a software load balancer and the hardware node can include a hardware load balancer and a gateway.

In some embodiments, the computer-executable instructions, when executed by the processor, cause the processor to perform operations that further can include associating the data that identifies the path/flow with a timeout value. The operations can further include starting a timer and determining if the timer has reached the timeout value. The operations can further include in response to determining that the timer has reached the timeout value, deleting, from the hardware cache, the data that identifies the path.

In some embodiments, the computer-executable instructions, when executed by the processor, cause the processor to perform operations that further can include receiving further data that identifies a further path. The operation can further include determining if the hardware cache is full. The operations can further include, in response to determining that the hardware cache is full, evicting the data from the hardware cache to allow storage of the further data.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

BRIEF DESCRIPTION OF THE DRAWINGS

FIGS. 1A-1M are system diagrams illustrating aspects of an illustrative operating environment for various embodiments of the concepts and technologies described herein.

DETAILED DESCRIPTION

Figure 1A:
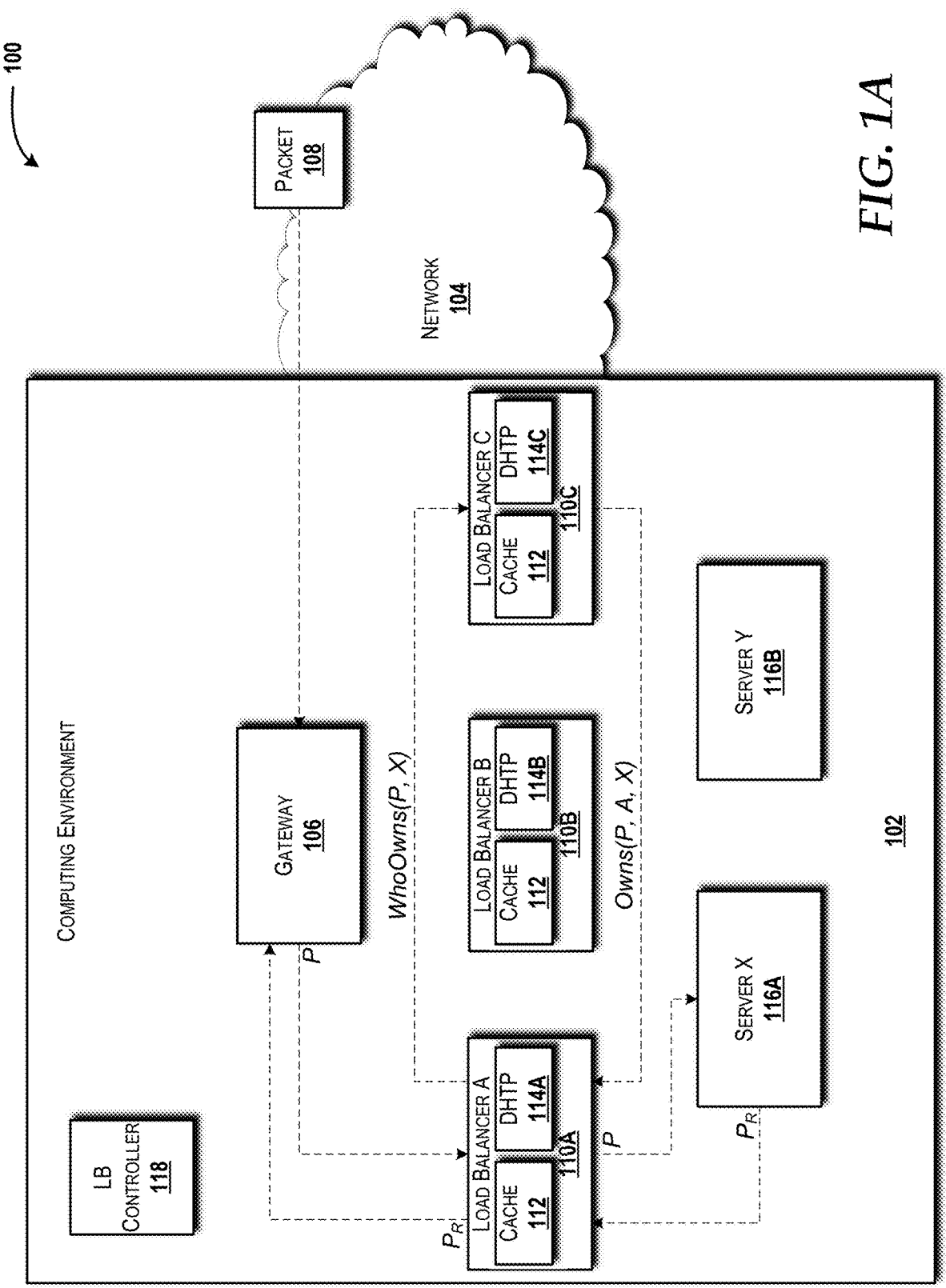

The concepts and technologies disclosed herein are applicable to any stateful network functions, such as, but not limited to, load balancers, firewalls, network address translation ("NAT") systems, gateways, and the like. Although the concepts and technologies disclosed herein will be described in the context of specific illustrative embodiments in which one or more stateful network functions is/are embodied as a load balancer or NAT system, specifically, these embodiments should not be construed as being limiting in any way. Moreover, those skilled in the art will appreciate the applicability of the concepts and technologies disclosed herein for different implementations than the examples explicitly set forth herein.

The following detailed description is directed, in part, to a distributed stateful load balancer (hereinafter referred to as a "load balancer"). A load balancer that receives the packet from a gateway can determine, based on a hash value associated with the packet, a load balancer to query for path information and/or ownership information (if the load balancer that receives the packet does not store path information for the packet). The load balancer can query the load balancer identified and receive a response with the path and/or ownership information. Based on the received information, the load balancer can forward the packet to an endpoint as identified. The load balancer that receives the response also can be configured to generate an entry for its distributed hash table portion, where the entry can identify the path, ownership, and/or endpoint associated with the path. Thus, when a subsequent packet is received by the same load balancer (that generated the query), the load balancer can determine the path associated with the subsequent packet without querying another load balancer.

In the event of a scale event (e.g., a scaling of load balancing functionality and/or of servers of the computing environment), the load balancers can be configured to maintain flow affinity. In particular, if a new instance of the load balancing functionality is introduced to the computing environment, e.g., a new load balancer is added to the computing environment, a load balancer controller can be configured to redistribute and/or re-divide the distributed hash table across the load balancers and to update hash value ranges maintained by the load balancers. According to various embodiments of the concepts and technologies disclosed herein, the load balancer controller can be configured to generate a state transfer command and to send the state transfer command to one of the load balancers that is to offload some portion of its distributed hash table portion to the new load balancer. The load balancer controller can send the state transfer command to the load balancer and in response to receiving the state transfer command, the load balancer that receives the state transfer command can divide its associated distributed hash table portion into the two or more sub-portions. It can be appreciated that the two or more sub-portions can include at least the same data as was included in the distributed hash table portion. The load balancer also can be configured to transfer one of the sub-portions to the new load balancer that has been introduced to the computing environment.

The load balancer can transmit, to the new load balancer, one of the sub-portions and to retain another of the sub-portions. After transfer of the sub-portion to the new load balancer is completed, the load balancer can send a state transfer confirmation or other message to the load balancer controller to inform the load balancer controller that the state transfer is complete. The load balancer can be configured to send updates to the other load balancers to update the key ranges associated with the multiple distributed hash table portions. Thus, the load balancers can be updated to query the new load balancer if a packet with an associated hash value that is in a range of the sub-portion is received.

The concepts and technologies disclosed herein also are directed, in part, to extending distributed hash table-based software network functions to hardware network functions, such as hardware network functions implemented using switching application-specific integrated circuits ("ASICs"). Hardware and software each has its unique advantage for implementing network functions. Hardware can achieve a high forwarding capacity of terabits of data with a single node but is limited in the size of flow table it can store. Software, on the other hand, can store very large flow tables with billions of entries but has a much lower forwarding capacity of tens of gigabits per second. Thus, it can be possible that a single hardware switch can replace up to a hundred software-based network functions in terms of forwarding capacity. The concepts and technologies disclosed herein can bring a vast reduction in cost for network functions provided hardware and software elements are combined effectively to store flow table entries.

The concepts and technologies disclosed herein explore how to best utilize the capabilities of both hardware and software for implementing stateful network functions. The concepts and technologies disclosed herein treat a hardware node similar to a software node. Both hardware and software nodes can utilize the same wire protocol and can support the same operations. The hardware nodes, however, are configured to store cache entries only. Each entry cached in hardware is backed up by at least one entry stored in software. A benefit of the concepts and technologies disclosed herein is that the traffic load on software nodes, such as software load balancers, is dramatically reduced. Indeed, in many cases, the traffic completely bypasses the software load balancers. If the hardware cannot cache a flow, the distributed software load balancer can seamlessly absorb additional load.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIGS. 1A-1G, aspects of an operating environment 100 for various embodiments of the concepts and technologies disclosed herein for a distributed stateful load balancer will be described, according to an illustrative embodiment. The operating environment 100 shown in FIGS. 1A-1G can include a computing environment 102. The computing environment 102 can operate in communication with and/or can include a part of a communications network ("network") 104.

According to various embodiments, the functionality of the computing environment 102 may be provided by one or more server computers, desktop computers, mobile telephones, laptop computers, tablet computers, other computing systems, and the like. In various embodiments of the concepts and technologies disclosed herein, the functionality of the computing environment 102 can be provided by one or more data centers and/or portions thereof such as server computers, or the like. Thus, it should be understood that the functionality of the computing environment 102 can be provided by a single device, by two similar devices, and/or by two or more dissimilar devices. The computing environment 102 includes at least a processor and a memory. Example architectures for the computing environment 102 will be illustrated and described below with reference to FIGS. 7 and 9. For purposes of describing the concepts and technologies disclosed herein, the computing environment 102 will be described herein as a data center including at least one server computer having a processor and a memory. It should be understood that this embodiment is illustrative, and should not be construed as being limiting in any way.

The computing environment 102 can include a gateway 106. The gateway 106 can correspond to an ingress point associated with the computing environment 102. In some embodiments, the gateway 106 can control ingress of data and/or flows to the computing environment 102 from networks such as the network 104, as well as egress of data and/or flows from the computing environment 102 to other networks such as the network 104. In some example implementations, packetized traffic (e.g., traffic that includes a packet 108) can enter and/or leave the computing environment 102 via the gateway 106. As is generally understood, packets 108 can include headers that can identify, inter alia, the source IP address, the destination IP address, the source port, the destination port, and the protocol associated with the packet 108. The gateway 106 can be configured to generate a hash value based on the data in the headers, if desired, and/or the gateway 106 can forward the packet 108 to other entities that can generate hash values. It should be understood that this example is illustrative, and therefore should not be construed as being limiting in any way.

According to various embodiments of the concepts and technologies disclosed herein, the computing environment can include two or more load balancers 110A-110N (hereinafter collectively and/or generically referred to as "load balancers 110"). In the illustrated example, three load balancer 110A-110C are shown. The load balancers 110 can include, in some embodiments, multiple instances of virtual functions (e.g., load balancing virtual functions) that can be executed by the computing environment 102. It should be understood that this example is illustrative, and therefore should not be construed as being limiting in any way.

The gateway 106 can be configured to route a received packet 108 to one of the load balancers 110. In some embodiments, the gateway can be configured to apply an n equal cost multi-path ("ECMP") scheme to distribute packets to the load balancers 110. Thus, for example, the packet 108 may be received by the gateway 106, and the gateway 106 can identify one of the load balancers 110 based on an ECMP policy or scheme. It therefore can be appreciated that according to various embodiments of the concepts and technologies disclosed herein, the gateway 106 can operate as a stateless load balancer, in various embodiments. As will be explained in more detail herein, each of the load balancers 110 illustrated and described herein can operate as a stateful load balancer.

Once the path is established between the gateway 106 and one of the load balancers 110, data associated with the path (e.g., ownership of the path and/or endpoints associated therewith) can be stored by one or more of the load balancers 110. In particular, each of the load balancers 110 can include, inter alia, a cache 112 and a distributed hash table portion ("DHTP") 114A-114C (hereinafter collectively and/or generically referred to as "DHTP 114"). The cache 112 and/or the DHTPs 114 can identify paths between the load balancers 110 and one or more endpoints such as the gateway 106 and/or servers 116A-116N (hereinafter collectively and/or generically referred to as "servers 116"). In the illustrated example, two servers 116A-116B are shown. A load balancer controller 118 can be configured to control the updating and/or maintenance of the DHTPs 114, in some embodiments.

As can be appreciated with reference to FIGS. 1A-1G, the DHTPs 114 can be partitions or portions of a distributed hash table ("DHT") 120 (best shown in FIG. 1E). Thus, as used herein and in the claims, a "portion of a distributed hash table" can correspond to a portion or partition of the DHT 120. The DHT 120 can collectively be represented by the DHTPs 114. According to various embodiments, the DHT 120 can be represented by multiple DHTPs 114 that can be distributed across the load balancers 110. It should be understood that this example is illustrative, and therefore should not be construed as being limiting in any way.

According to various embodiments of the concepts and technologies disclosed herein, a load balancer 110 can receive a forwarded packet, such as the packet 108, from the gateway 106. The load balancer 110 can examine its local DHTP 114 to determine a path associated with the packet 108. A path associated with the packet 108 may be important for applications and/or environments in which flow affinity must be maintained. Thus, the load balancers 110 can be configured to store data that can identify paths and/or ownership for data flows (e.g., traffic associated with the packet 108) so that the packet 108 can be reliably forwarded to a correct endpoint (e.g., a particular one or more of the servers 116, or the like). Each of the load balancers 110 can store, in addition to one of the DHTPs 114, a key table or other data structure that can indicate key ranges of the DHTPs 114 stored by the load balancers 110. Thus, when the packet 108 is received at one of the load balancers 110, the load balancer 110 can obtain a hash value associated with the packet 108. It can be appreciated that the hash value can be received from other entities or generated by the load balancer 110 and that the hash value can uniquely identify a flow associated with the packet 108.

Thus, the load balancer 110 can identify which of the DHTPs 114 stores information that identifies the path associated with the packet 108. The load balancer 110 can be configured to generate a query. The query can request path information and/or ownership information for the packet 108. Thus, the query also can include the hash value, in some embodiments. The query also can include an instruction to insert a path in the DHTP 114 if the DHTP 114 does not include the path information (e.g., if the packet 108 is associated with a new flow that is not yet represented by the DHTPs 114.) The query can be sent to the load balancer 110 identified. If the load balancer 110 that was queried identifies an entry in its DHTP 114, the load balancer 110 can respond to the query with a response that includes, inter alia, data that identifies the path and/or ownership information. It should be understood that this example is illustrative, and therefore should not be construed as being limiting in any way.

The load balancer 110 that generated the query can receive the response and forward the packet 108 along the path identified in the response. The load balancer 110 that receives the response also can be configured to store the data that identifies the path in its cache and/or its DHTP 114 for use when subsequent packets associated with the flow are received. It should be understood that this example is illustrative, and therefore should not be construed as being limiting in any way.

Figure 1B:
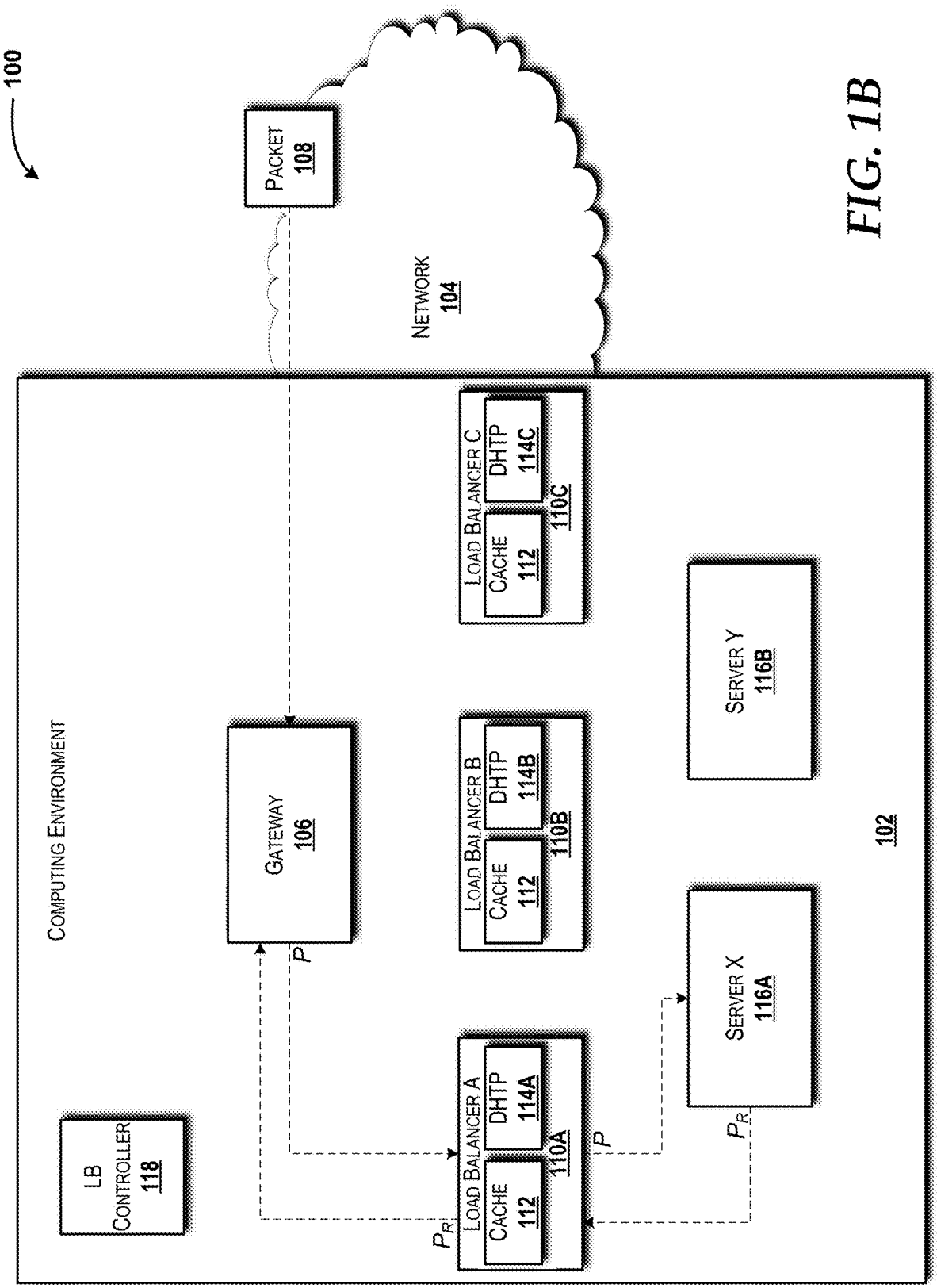
Figure 1C:
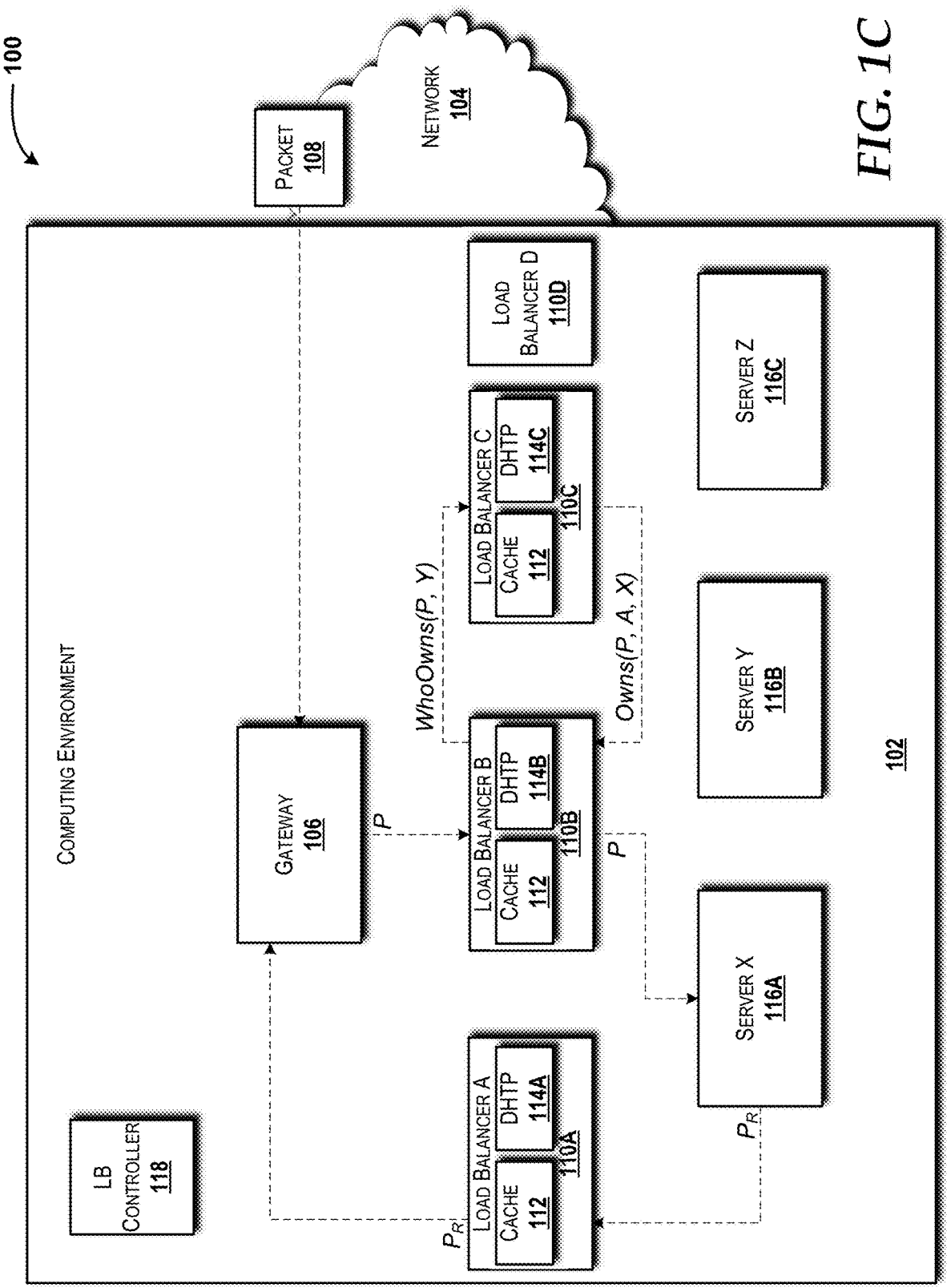

As shown in FIGS. 1C-1D, and as can be appreciated from the description herein, when a new load balancer 110 is added (shown as load balancer 110D), the gateway 106, which may apply an ECMP routing scheme to the packets 108 received by the gateway 106, may route one or more of the packets 108 associated with a particular path to a different load balancer 110 (i.e., a load balancer 110 other than a load balancer 110 that previously was involved in forwarding the packet(s) 108 associated with a particular flow to a specific server 116). Thus, scaling of the load balancers 110 can cause the flow affinity between a load balancer 110 and an endpoint such as a server 116 to be lost. Embodiments of the concepts and technologies disclosed herein can prevent such a loss of flow affinity.

It also can be appreciated with reference to FIG. 1C, that in some embodiments, the addition of the new load balancer 110D can be in response to the addition of a new server 116C (Server Z). Although the new server 116C has been added, the existing flow can still be routed to the same server 116A as before the addition of the new server 116C. Thus, it can be appreciated that by using the concepts and technologies disclosed herein, flow affinity can be restored and/or not lost. In particular, as will be explained below with reference to FIG. 1D, the concepts and technologies disclosed herein can be used to allow server scaling while preserving flow affinity (in addition to preserving flow affinity after scaling the load balancing functions).

Additionally, as will be appreciated with reference to FIG. 1D below, embodiments of the concepts and technologies disclosed herein enable maintaining flow affinity for a flow or path whether the connection associated with the flow or path is initiated by one of the servers 116 and/or initiated by an outside user or entity (with the flow being directed to one of the servers 116). Thus, embodiments of the concepts and technologies disclosed herein can support scaling of load balancers 110 and servers 116 while maintaining flow affinity. It should be understood that these examples are illustrative, and therefore should not be construed as being limiting in any way.

In particular, as shown in FIG. 1C-1D, the load balancer 110B that receives the packet 108 from the gateway 106 (instead of the load balancer 110A that previously was receiving packets as shown in FIGS. 1A-1B) can determine, based on a hash value associated with the packet 108, the load balancer 110 to query for path information and/or ownership information. The load balancer 110 can receive a response with the path and/or ownership information and forward the packet to the endpoint identified. The load balancer 110 that receives the response can generate an entry for its DHTP 114, where the entry can identify the endpoint. Thus, when a subsequent packet is received, the load balancer 110 can determine the path associated with the subsequent packet without querying another load balancer 110. It should be understood that this example is illustrative, and therefore should not be construed as being limiting in any way.

Figure 1F:
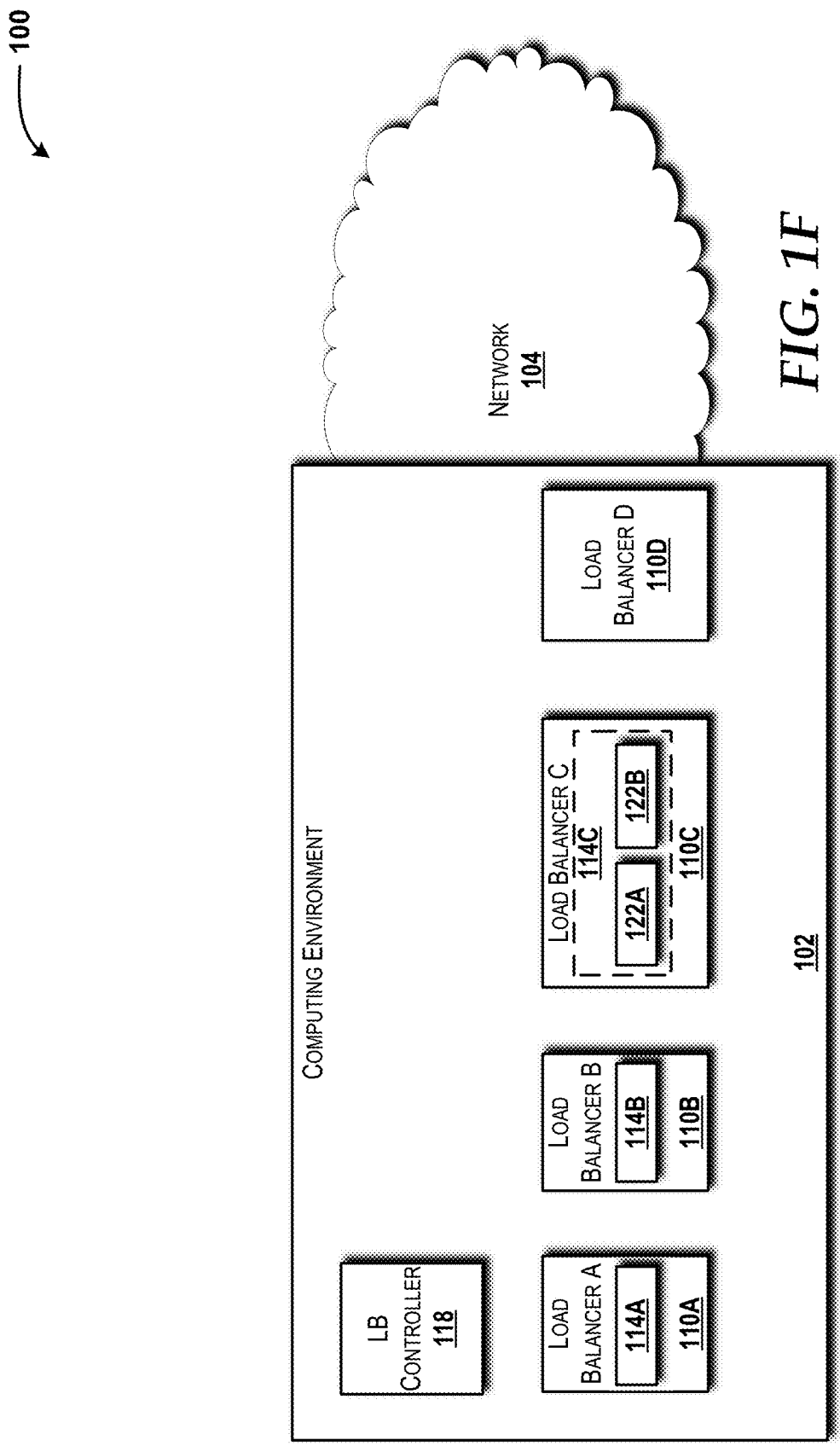

Embodiments of the concepts and technologies disclosed herein also can be configured to support elastic scaling of load balancing functionality and/or of the servers 116 of the computing environment 102. In particular, if a new instance of the load balancing functionality is introduced to the computing environment 102, e.g., a new load balancer 110D is added to the computing environment 102, the load balancer controller 118 can be configured to redistribute and/or re-divide the DHT 120 across the load balancers 110. In the context of the example implementations shown in FIGS. 1A-1G, the load balancer controller 118 can be configured to re-divide and/or redistribute the DHT 120 (from being distributed across three DHTPs 114A-114C as shown in FIGS. 1E-1F to being distributed across two DHTPs 114A-114B and two sub-portions 122A-122B (hereinafter collectively and/or generically referred to as "sub-portions 122") of the DHTP 114C as shown in FIG. 1G.

According to various embodiments of the concepts and technologies disclosed herein, the load balancer controller 118 can be configured to generate a state transfer command and to send the state transfer command to one of the load balancers 110. In the example shown in FIG. 1E, the load balancer controller 118 can send the state transfer command to the load balancer 110C. It should be understood that this example is illustrative, and therefore should not be construed as being limiting in any way.

In response to receiving the state transfer command, the load balancer 110C can be configured to divide its associated DHTP 114C into the two sub-portions 122. An example of this dividing of the DHTP 114C into the two sub-portions 122 is illustrated in FIG. 1F. It can be appreciated that the two sub-portions 122 can include the same data as was included in the DHTP 114C. The load balancer 110C can be configured to transfer one of the sub-portions 122 to a new load balancer 110D that has been introduced to the computing environment 102.

In the example shown in FIG. 1G, the load balancer 110C can transmit, to the load balancer 110D, the sub-portion 122B and can retain the sub-portion 122A. It similarly can be understood that the sub-portion 122A can replace the DHTP 114C and/or can be functionally equivalent to a new version of the DHTP 114C at the load balancer 110C. Similarly, the sub-portion 122B can functionally be equivalent to a DHTP 114D for the load balancer 110D. It should be understood that this example is illustrative, and therefore should not be construed as being limiting in any way.

After transfer of the sub-portion 122B to the new load balancer 110D is completed, the load balancer 110C can send a state transfer confirmation or other message to the load balancer controller 118 to inform the load balancer controller 118 that the state transfer is complete. The load balancer controller 118 can be configured to send updates to the other load balancers 110 (e.g., the load balancers 110A and 110B) to update the key ranges associated with the multiple DHTPs 114. Thus, the load balancers 110 can be updated to query the load balancer 110D (instead of the load balancer 110C) if a packet 108 with an associated hash value that is in a range of the sub-portion 122B is received. It should be understood that this example is illustrative, and therefore should not be construed as being limiting in any way.

FIGS. 1A-1G illustrate one computing environment 102, one network 104, one gateway 106, three and four load balancers 110, two and three servers 116, and one load balancer controller 118. It should be understood, however, that various implementations of the operating environment 100 can include more than one computing environment 102; more than one network 104; more than one gateway 106; two, three, four, or more than four load balancers 110; more than three servers 116; and/or zero, one, or more than one load balancer controller 118. As such, the illustrated embodiments should be understood as being illustrative, and should not be construed as being limiting in any way.

FIGS. 1A-1G primarily focus on a software-based implementation of a distributed stateful load balancer, although those skilled in the art will appreciate the applicability of the concepts and technologies introduced with respect to FIGS. 1A-1G to be applicable to other network functions such as firewalls, network address translation ("NAT") systems, gateways, and the like. FIGS. 1H-1M explore how to best utilize the capabilities of both hardware and software for implementing stateful network functions. The concepts and technologies disclosed herein treat a hardware node similar to a software node. Both hardware and software nodes can utilize the same wire protocol and can support the same operations. The hardware nodes, however, are configured to store cache entries only, such as in a cache 112. Each entry cached in hardware is backed up by at least one entry stored in software. A benefit of the concepts and technologies disclosed herein is that the traffic load on software nodes, such as software load balancers, is dramatically reduced. Indeed, in many cases, the traffic completely bypasses the software load balancers. If the hardware cannot cache a flow, the distributed software load balancer can seamlessly absorb additional load.

Figure 1H:
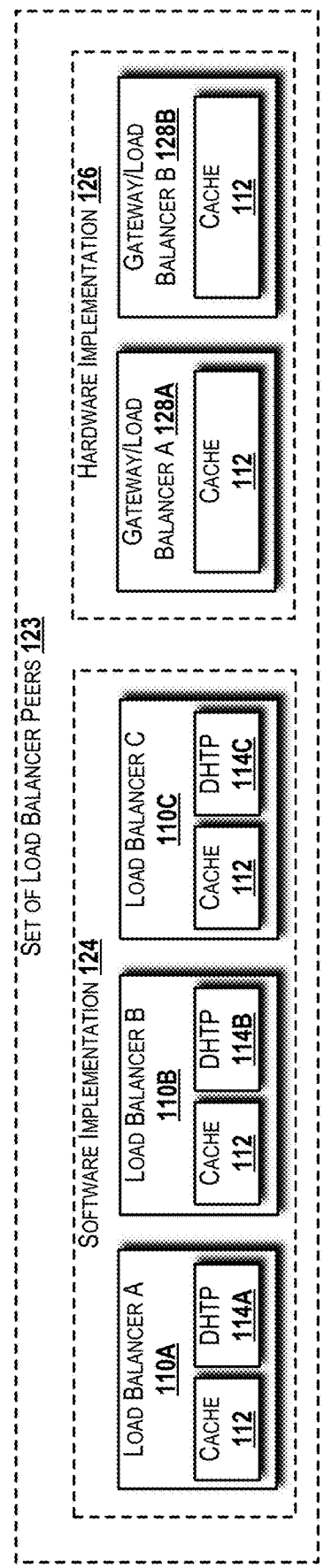

Turning now to FIG. 1H, a set of load balancer peers 123 is shown having a software implementation 124 and a hardware implementation 126. The software implementation 124 can include one or more software nodes. The hardware implementation 126 can include one or more hardware nodes. In some embodiments, the hardware nodes are implemented as application-specific integrated circuits ("ASICs"), although other hardware-based implementations are contemplated. A hardware node (e.g., a switching ASIC) has a much larger forwarding capacity than a software node. In some instances, a hardware node may provide up to one hundred times more forwarding capacity than a similar node configured only in software. The hardware nodes in the hardware implementation 126 can be used to implement flow tables similar or identical to those implemented by the software nodes of the software implementation 124. The split implementation of the set of load balancer peers 123 (or a set of other network functions) can be implemented using modern switches already deployed in a datacenter, and thus the split implementation requires no additional capital expenditure.

In the illustrated example, the software implementation 124 includes load balancers 110A-110C, each implemented as software nodes having a cache 112 and a DHTP 114; and the hardware implementation 126 includes combination gateway and load balancers ("gateway/load balancer") 128A-128B, each implemented as hardware nodes having only a cache 112 and no DHTP 114. In this configuration, the traffic load on the load balancers 110A-110C in the software implementation 124 is dramatically reduced, and, in some cases, traffic can completely bypass the load balancers 110A-110C in the software implementation 124. If the load balancers 110D-110E in the hardware implementation 126 cannot cache data associated with a path, the distributed software load balancer (i.e., the load balancers 110A-110C in the software implementation 124) can seamlessly absorb additional traffic load. This concept can be implemented using modern switching hardware that a datacenter or other computing environment 102 already has. Moreover, by using the same distributed protocol as a software load balancer, a hardware load balancer (e.g., the load balancer 110D or 110E) implemented in accordance with the concepts and technologies disclosed herein can be readily deployed and is arguably a simpler design than existing hardware offload solutions.

Figure 1I:
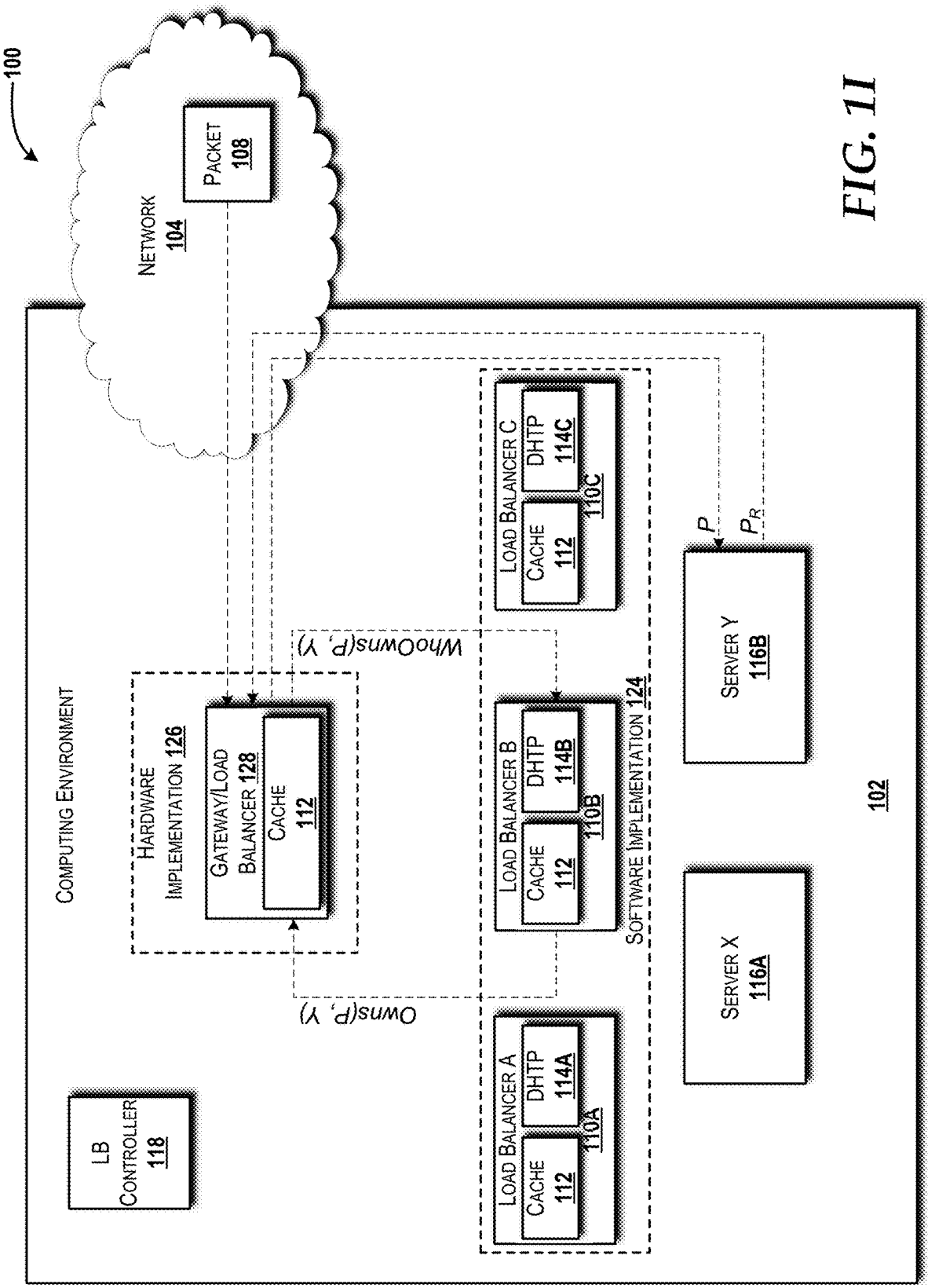

Turning now to FIG. 1I, the operating environment 100 is shown with the software implementation 124 of load balancer functions via the load balancers 110A-110C and the hardware implementation 126 of both gateway and load balancer functions via a combination gateway/load balancer 128. As noted above, each of the load balancers 110A-110C in the software implementation 124 is configured to include a cache 112 and a DHTP 114, while the gateway/load balancer 128 in the hardware implementation 126 is configured to include only a cache 112.

FIG. 1I specifically shows an external-to-internal flow (i.e., from the network 104 to the computing environment 102) for a first packet, such as the packet 108. The gateway function of the gateway/load balancer 128 in the hardware implementation 126 can receive the packet 108 from the network 104 and can provide the packet 108 to the load balancer function of the gateway/load balancer 128. The load balancer function of the gateway/load balancer 128 can determine if data that identifies the path associated with the packet 108 is stored in the cache 112 of the gateway/load balancer 128. In this example, the packet 108 is the first packet of a new external-to-internal flow, and therefore data that identifies a path associated with the packet 108 is not yet stored in the cache 112 of the gateway/load balancer 128. The gateway/load balancer 128 can be configured to generate a query directed to one of the load balancers 110 in the software implementation 124, such as the load balancer 110B in the illustrated example. The query can request path information and/or ownership information for the packet 108. The query also can include an instruction to insert a path in the DHTP 114 of the load balancer 110B since the packet 108 is associated with a new flow that is not yet represented in the DHTP 114. The query can be sent to the load balancer 110B. The gateway/load balancer 128 that generated the query can receive the response and forward the packet 108 along the path identified in the response. The return path from the endpoint (e.g., server Y 116B) bypasses the load balancers 110A-110C to reduce load on the software implementation 124. The gateway/load balancer 128 also can be configured to store the data that identifies the path in its cache 112 for use when subsequent packets associated with the flow are received, such as in the example shown in FIG. 1J.

Figure 1J:
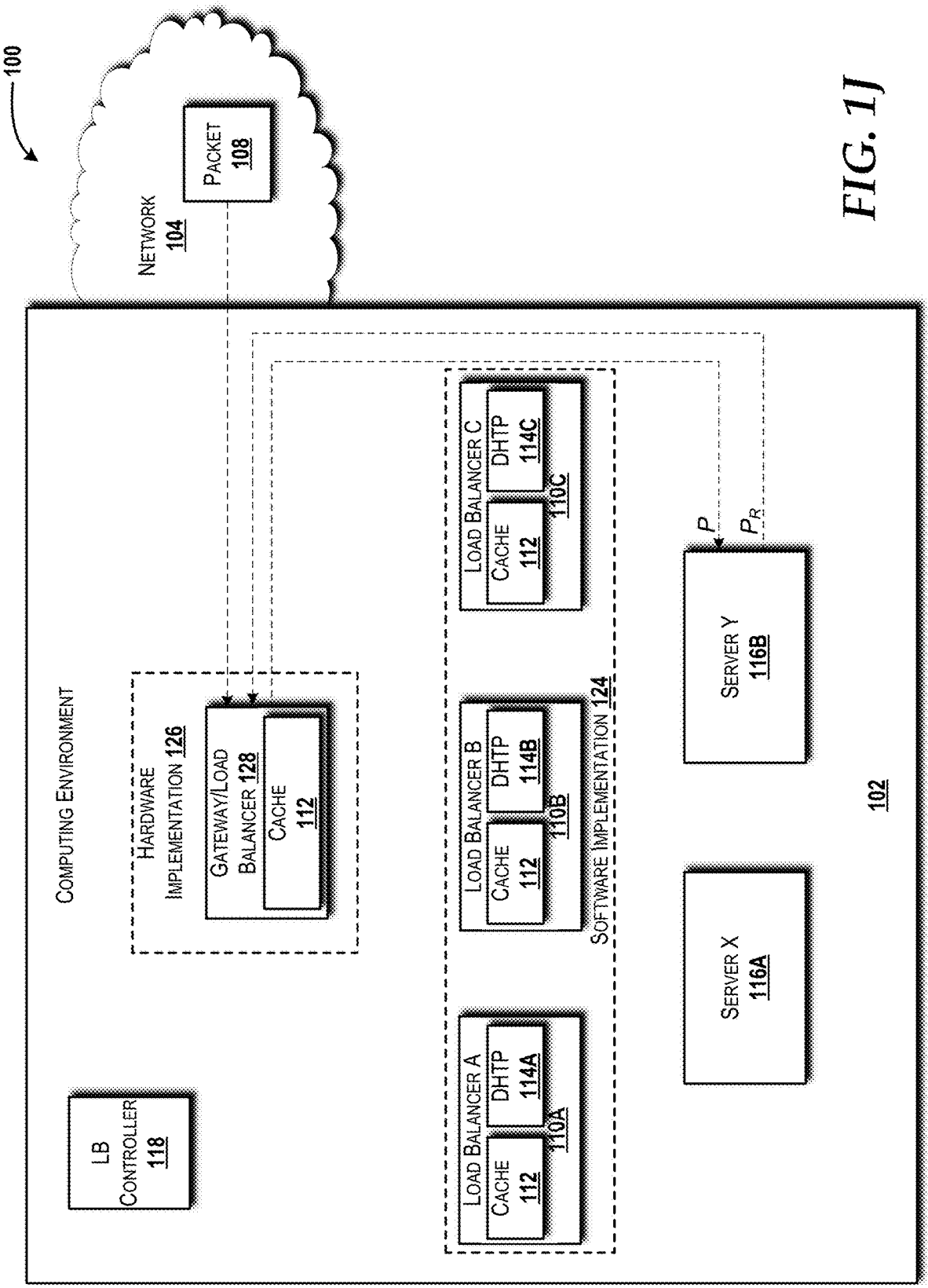

In FIG. 1J, the gateway/load balancer 128 can receive subsequent packets 108 associated with the new flow for which data that identifies the path was stored in the cache 112 of the gateway/load balancer 128 (as described above with reference to FIG. 1I). The gateway/load balancer 128 can determine the path for the packets 108 via a search of its cache 112 for an entry that includes the data that identifies the path. The gateway/load balancer 128 can use the cached entry to directly send the subsequent packets 108 to the endpoint (server Y 116B in this example). The software implementation 124 does not need to process any packets either in the forward path or the return path.

Figure 1K:
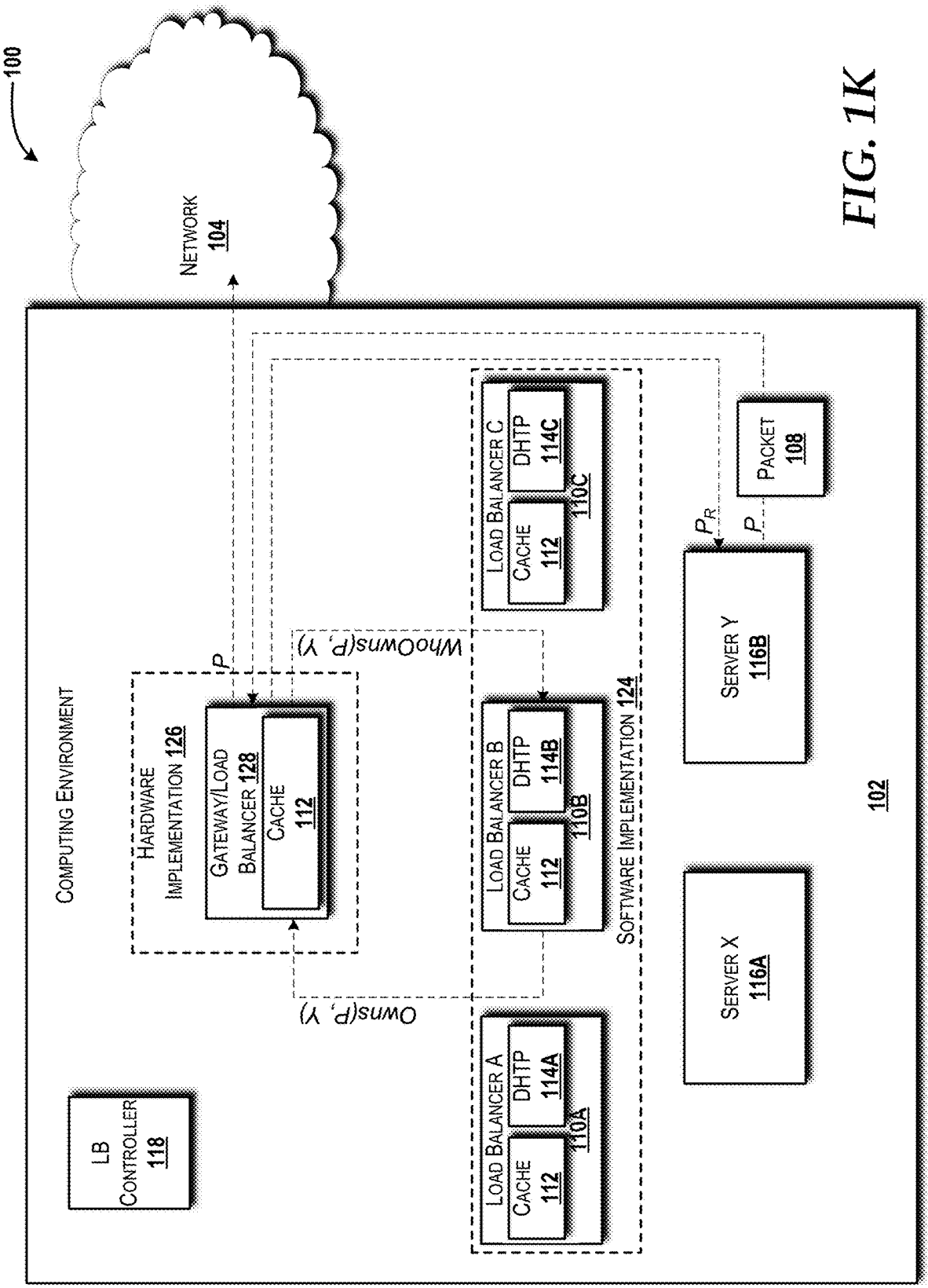
Figure 1L:
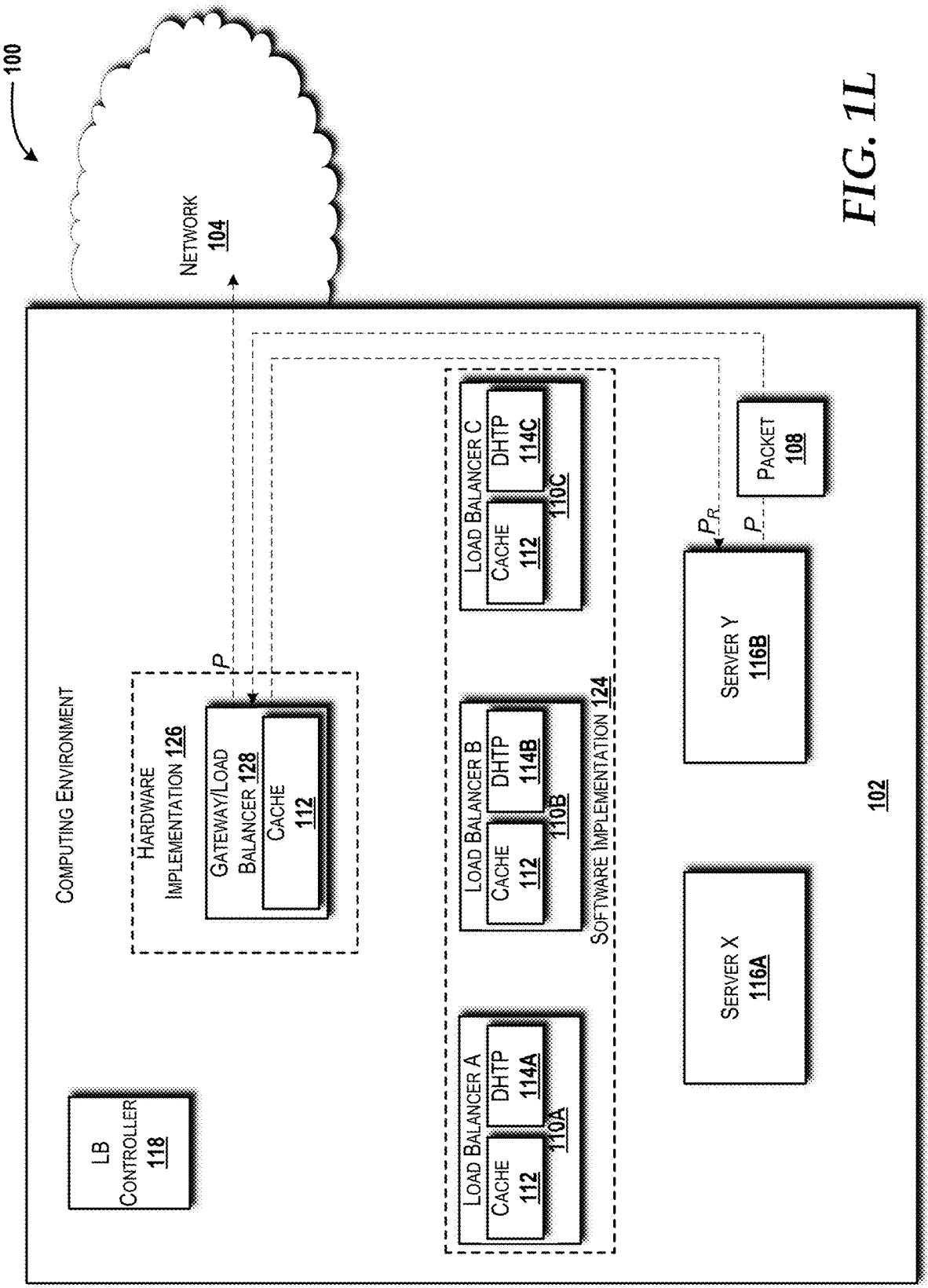

Turning now to FIG. 1K, an internal-to-external flow (i.e., computing environment 102 to the network 104) for a first packet, such as the packet 108, will be described. The flow originates from inside the computing environment 102, and specifically, from the server Y 116B in the example shown, and is directed towards the gateway/load balancer 128. The gateway/load balancer 128 can trigger insertion of a path in the DHTP 114B of the load balancer 110B as before and can store the response in the cache 112. The return path of the internal-to-external flow uses the cached path entry to send return packets to the server Y 116B. As best shown in FIG. 1L, subsequent packets in either direction bypass the software implementation 124.

Turning now to FIG. 1M, an example configuration in which the hardware implementation 126 includes multiple hardware nodes, such as a gateway/load balancer 128A and a gateway/load balancer 128B, will be described, according to an illustrative embodiment. Although only two hardware nodes are shown in the illustrated configuration, more than two hardware nodes are contemplated. In the illustrated configuration, a path entry can be cached in the cache 112 of each of the gateway/load balancers 128A-128B. In this manner, the hardware implementation 126 can handle routing changes due to hardware and/or other failures.

Figure 2:
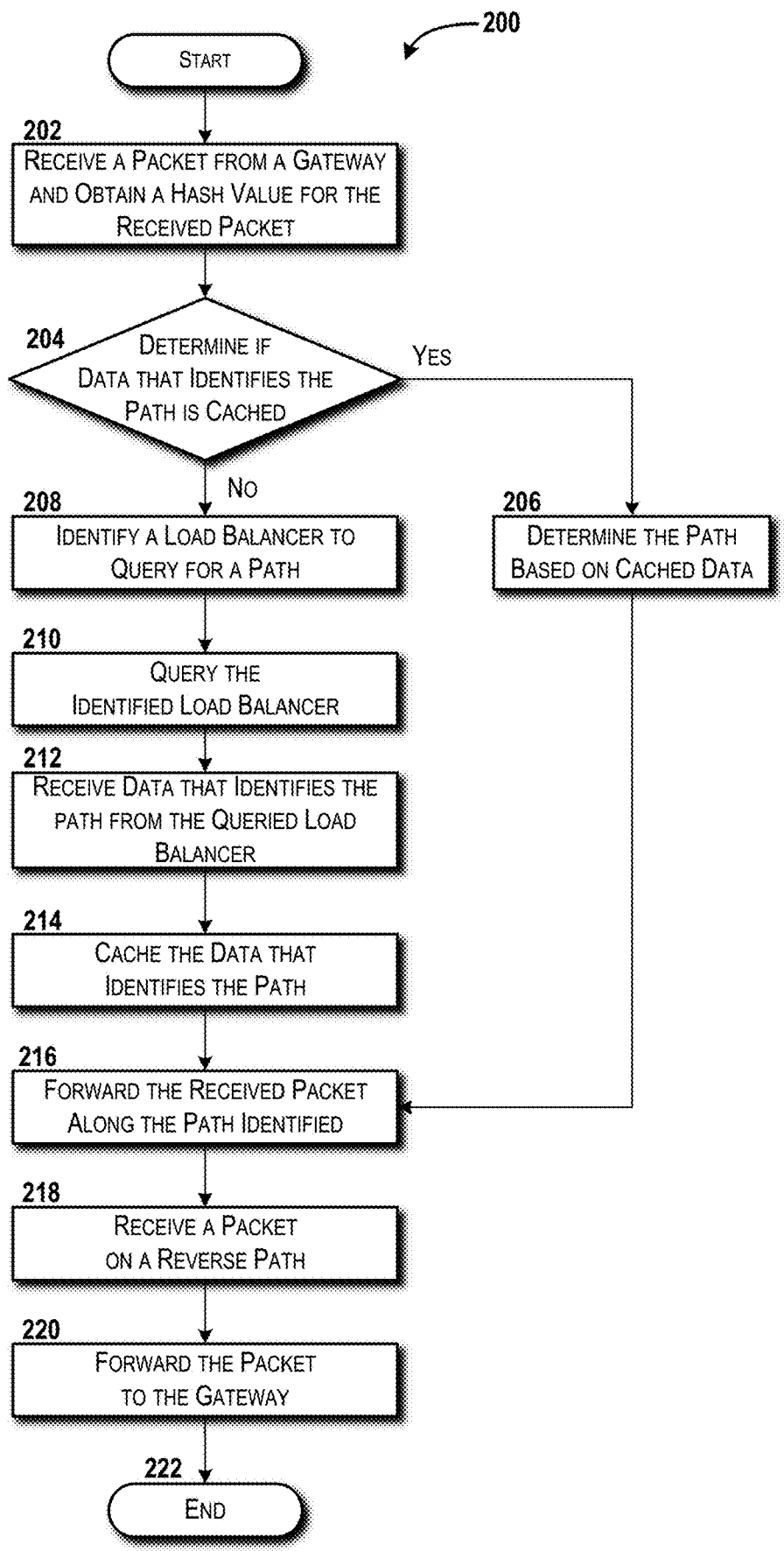
FIG. 2 is a flow diagram showing aspects of a method for providing a distributed stateful load balancer, according to an illustrative embodiment of the concepts and technologies described herein.

Turning now to FIG. 2, aspects of a method 200 for providing a distributed stateful load balancer will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the computing environment 102, to perform one or more operations and/or causing the processor to direct other components of the computing system or device to perform one or more of the operations.

For purposes of illustrating and describing the concepts of the present disclosure, the method 200 is described herein as being performed by the load balancer 110B. It should be understood that any one of the load balancers 110 can perform the method 200, according to various embodiments. For purposes of clarifying the concepts and technologies disclosed herein, the example implementations illustrated in FIGS. 1A-1D will be referred to when describing the operations of FIG. 2. The method 200 will be described as being performed by the load balancer 110B, in accordance with the example shown in FIGS. 1C-1D. Because other load balancers 110 can perform some or all of the operations illustrated and described herein, and because additional and/or alternative devices and/or network nodes can provide the functionality described herein via execution of one or more modules, applications, and/or other software, it should be understood that the illustrated embodiment is illustrative, and should not be viewed as being limiting in any way.

The method 200 begins at operation 202. At operation 202, the load balancer 110B can receive a packet 108 from a gateway 106. In operation 202, the load balancer 110B also can obtain a hash value for the received packet 108. In some embodiments, the gateway 106 can receive the packet 108 from a network external to the computing environment 102, for example the network 104, and the gateway 106 can generate a hash value for the packet 108 and forward that hash value along with the packet 108 to the load balancer 110B. In some other embodiments, the gateway 106 can forward the packet 108 to the load balancer 110B, and the load balancer 110B can generate the hash value. Regardless of how the hash value is generated, it can be understood that the load balancer 110B that receives the packet 108 can also obtain a hash value associated with the packet 108.

According to various embodiments, as explained above with reference to FIGS. 1A-1G, the gateway 106 can be configured to forward the packet 108 to the load balancer 110B by applying an equal cost multipath ("ECMP") scheme whereby packets associated with traffic (e.g., the packet 108) can be distributed to the load balancers 110 without analysis by the gateway 106. In the example shown in FIG. 1C, however, it can be appreciated that traffic associated with a particular flow previously may have been forwarded by the load balancer 110A, but due to, for example, an addition of another load balancer 110, the traffic may now be forwarded to the load balancer 110B. For example, if there are n load balancers 110, an nth load balancer 110N may receive every nth packet 108 on average, as the gateway 106 can be configured to distribute the packets 108 across the n load balancers 110. It should be understood that this example is illustrative, and therefore should not be construed as being limiting in any way.

From operation 202, the method 200 can proceed to operation 204. At operation 204, the load balancer 110B can determine if data that identifies the path associated with the packet 108 is cached by the load balancer 110B (i.e., stored in the cache 112 of the load balancer 110B). As explained above, and as will be explained in more detail below with reference to operation 214, the load balancer 110B can be configured to store data that identifies paths in its cache 112. In particular, if the load balancer 110B receives a packet 108 and does not own the path associated with the packet 108 and/or recognizes that another load balancer 110 stores a DHTP 114 that identifies the path associated with the packet, the load balancer 110B can query that load balancer 110 and obtain data that identifies the path. This data can be stored by the load balancer 110B in its cache 112 so that when a future packet 108 associated with the particular path is received, the load balancer 110B can determine the path for that packet 108 via a search of its cache 112 (thereby obviating the need to identify another load balancer 110 that stores data identifying the path, querying that identified load balancer 110, and receiving the data that identifies the path).

Thus, it can be appreciated that the caching of the data that identifies the path can result in improved efficiency of systems in accordance with various embodiments of the concepts and technologies disclosed herein. Namely, such a system can reduce its local processing operations (e.g., to identify the load balancer 110 to query) and network usage (e.g., by sending queries to and/or receiving responses from the identified load balancer 110). Thus, if the load balancer 110B determines, in operation 204 that the cache 112 stores data that identifies a path associated with the packet 108 received in operation 202, this can indicate that a previous packet 108 has been received by the load balancer 110B and operations for obtaining the data identifying the path previously were performed. Thus, subsequent received packets 108 in a particular session can be forwarded by the load balancer 110B without identifying other load balancers 110 and/or communicating with those load balancers 110, thereby improving efficiency of the load balancer 110B and/or a system including the load balancer 110B. It should be understood that this example is illustrative, and therefore should not be construed as being limiting in any way.

If the load balancer 110B determines, in operation 204, that data identifying a path associated with the packet 108 is stored in the cache 112, the method 200 can proceed to operation 206. At operation 206, the load balancer 110B can determine the path based on the cached data. Thus, as noted above, the load balancer 110B can determine the path for the packet 108 received in operation 202 without: a) identifying the load balancer 110 that stores a DHTP 114 that stores the data identifying the path associated with the packet 108; b) querying the identified load balancer 110 for the data that identifies the path associated with the packet 108; and/or c) receiving, from the identified load balancer 110, the data that identifies the path associated with the packet 108.

If the load balancer 110B determines, in operation 204, that data identifying the path associated with the packet 108 is not stored in the cache 112, the method 200 can proceed to operation 208. At operation 208, the load balancer 110B can identify, among multiple load balancers 110 (including itself), a load balancer 110 to query to identify a path associated with the packet 108 received in operation 202. In operation 208, therefore, the load balancer 110B can determine that it does not own the path associated with the packet 108 received in operation 202 and that another load balancer 110 will be queried to determine ownership of the path. In the example implementation shown in FIG. 1C, the load balancer 110C is queried by the load balancer 110B. As such, this example implementation will be used in the description of the method 200 for clarity.

According to various embodiments of the concepts and technologies disclosed herein, the load balancer 110B can identify the load balancer 110 to query based on the hash value obtained in operation 202. In particular, the load balancer 110B can store data that identifies hash value ranges (hash ranges) associated with each of the distributed hash table portions 114 stored by the load balancers 110. For a particular hash value, e.g., the hash value obtained in operation 202, the load balancer 110B can determine which DHTP 114 includes a range in which the hash value falls or fits, and based on this determination, the load balancer 110B can identify the load balancer 110C to query for the path. Because the identification of the owner of a DHTP 114 is understood, this will not be further discussed herein.

From operation 208, the method 200 can proceed to operation 210. At operation 210, the load balancer 110B can query the load balancer 110C (or other load balancer 110 as identified in operation 208). The query generated and/or transmitted in operation 210 can be generated and/or transmitted for the purpose of identifying the path for the packet 108 received in operation 202. The query can include two portions of data. A first portion of the query can inquire as to the path associated with the packet 108 received in operation 202. A second portion of the query can instruct the receiving load balancer 110C (i.e., the load balancer 110 that is receiving the query sent in operation 210) to insert an entry in the DHTP 114C stored by the load balancer 110C if an entry does not exist in the DHTP 114C. Thus, embodiments of the concepts and technologies disclosed herein can reduce traffic among and/or between the load balancers 110 by enabling the insertion of entries in a distributed hash table 120 and/or portions thereof such as the distributed hash table portions 114 if no such entry is determined to exist. It should be understood that this example is illustrative, and therefore should not be construed as being limiting in any way.

From operation 210, the method 200 can proceed to operation 212. At operation 212, the load balancer 110B can receive a response from the queried load balancer 110C. The response received in operation 212 can include data that identifies the path. In some embodiments, the response also can include data that instructs the load balancer 110B to store the data identifying the path. In some embodiments, the response received in operation 212 can correspond to an entry for a distributed hash table 120 and/or a portion thereof such as the DHTP 114B stored by the load balancer 110B. As shown in the example implementation shown in FIG. 1D, the load balancer 110B can be informed by the response that the path for the packet 108 is to the server 116A; and that the path is owned by the load balancer 110A. Because the data received in operation 212 can be formatted in other ways and/or can indicate other paths and/or ownerships, it should be understood that this example is illustrative, and therefore should not be construed as being limiting in any way.

From operation 212, the method 200 can proceed to operation 214. At operation 214, the load balancer 110B can cache the data that identifies the path and/or ownership as received in operation 212. According to various embodiments, the load balancer 110B can store the data in the cache 112. According to various embodiments of the concepts and technologies disclosed herein, the data stored in the cache 112 can be stored for a time t. In various embodiments, the time t can correspond to a lifetime of the connection associated with the packet 108. In some other embodiments, the time t can be determined based on settings, preferences, and/or other considerations. It should be understood that this example is illustrative, and therefore should not be construed as being limiting in any way.

It also can be understood that the load balancer 110B can insert the data that identifies the path and/or ownership (e.g., if formatted as a distributed hash table entry) in the DHTP 114B stored by the load balancer 110B. The caching of the data that identifies the path and/or ownership can be used to improve efficiency of the computing environment 102 by reducing lookups and/or queries for subsequently-received packets 108. It should be understood that this example is illustrative, and therefore should not be construed as being limiting in any way.

From operation 214, the method 200 can proceed to operation 216. The method 200 also can proceed to operation 216 from operation 206. At operation 216, the load balancer 110B can forward the packet 108 along the path identified. Thus, the load balancer 110B can forward the packet 108 to the recipient identified by the path (e.g., the server 116A as shown in the example implementation shown in FIG. 1A). The packet 108 can include headers that identify the load balancer 110B, as generally is understood. Thus, the server or other network element that receives the packet 108 can be configured to send subsequent packets to the load balancer 110B. It should be understood that this example is illustrative, and therefore should not be construed as being limiting in any way.

Based on FIGS. 1A-1D, it can be appreciated that the operations 218 and 220 can be performed by any of the load balancers 110 illustrated and described herein. In particular, it can be appreciated that the packet 108 can specify a load balancer 110 in its headers that may be the same or may be different from the load balancer 110B that forward the packet 108 in operation 216. As such, it should be understood that operations 218 and 220 of the method 200 can performed by any one of the load balancers 110. In multiple implementations, as shown in FIGS. 1A-1D, the load balancer 110A can perform the operations 218 and 220. It should be understood that this example is illustrative, and therefore should not be construed as being limiting in any way.

From operation 216, the method 200 can proceed to operation 218. At operation 218, the load balancer 110A can receive a packet on a reverse path from the server 116A. For example, the server 116A can receive the packet 108 forwarded in operation 216, and respond with a subsequent packet that arrives at the load balancer 110A in operation 218. The load balancer 110A can examine a local cache 112 and/or DHTP 114A and can determine, based on that examination, that the subsequent packet is to be forwarded to the gateway 106. From operation 218, the method 200 can proceed to operation 220. At operation 220, the load balancer 110A can forward the packet to the gateway 106.

According to various embodiments, the forwarding of the subsequent packet as described in operations 216 and 218 can be performed by the load balancer 110A. Prior to performance of the operation 202, a path as shown in FIGS. 1A-1B can have existed, and the load balancer 110A can have already stored, in its cache 112 and/or DHTP 114A information that identifies the path. As such, it should be understood that this example is illustrative, and therefore should not be construed as being limiting in any way.

From operation 220, the method 200 can proceed to operation 222. The method 200 can end at operation 222.

Figure 3:
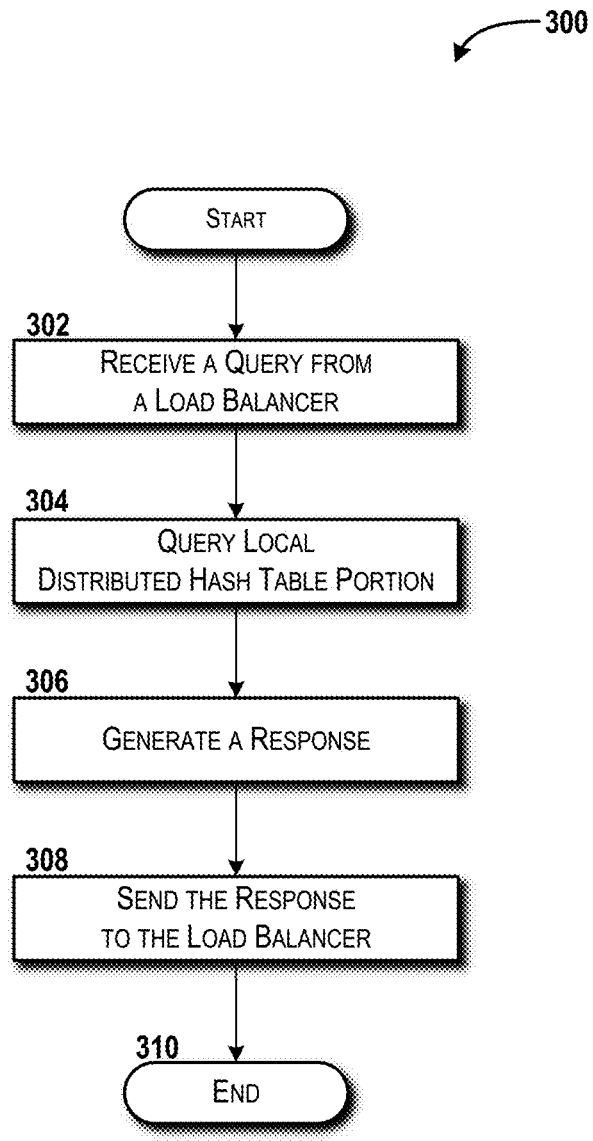
FIG. 3 is a flow diagram showing aspects of a method for providing a distributed hash table entry to a distributed stateful load balancer, according to an illustrative embodiment of the concepts and technologies described herein.

Turning now to FIG. 3, aspects of a method 300 for providing a distributed hash table entry to a distributed stateful load balancer will be described in detail, according to an illustrative embodiment. For purposes of illustrating and describing the concepts of the present disclosure, the method 300 is described herein as being performed by the load balancer 110C. It should be understood that any one of the load balancers 110 can perform the method 300, according to various embodiments. For purposes of clarifying the concepts and technologies disclosed herein, the example implementations illustrated in FIGS. 1A-1D will be referred to when describing the operations of FIG. 3. Because other load balancers 110 can perform some or all of the operations illustrated and described herein, and because additional and/or alternative devices and/or network nodes can provide the functionality described herein via execution of one or more modules, applications, and/or other software, it should be understood that the illustrated embodiment is illustrative, and should not be viewed as being limiting in any way.

The method 300 begins at operation 302. At operation 302, the load balancer 110C can receive a query. The query can be received from any other load balancer 110. In the example shown in FIG. 1A, for example, the load balancer 110C can receive a query from the load balancer 110A in an operation similar to operation 302. In the example shown in FIG. 1C, the load balancer 110C can receive the query from the load balancer 110B. Because the query can be received from other load balancers 110, it should be understood that this example is illustrative, and therefore should not be construed as being limiting in any way.

The query received in operation 302 can include a query and a command. The query can request identification of a path associated with a packet 108, while the command portion can instruct the load balancer 110C that receives the query to insert an entry in its DHTP 114C if an entry for the path does not already exist in the DHTP 114C. In other words, if the packet 108 is associated with a new flow that is not represented by the DHTP 114C stored by the receiving load balancer 110C (the load balancer 110 that received the packet 108), the receiving load balancer 110C can be configured to insert an entry for the path in the DHTP 114C stored by the receiving load balancer 110C.

Thus, the term "query," when used herein and in the claims as a noun, refers to data that includes at least two data elements. Namely, a first data element of the query includes or corresponds to a request to identify information that is being requested. A second data element of the query includes or corresponds to a command to insert an entry in a DHTP 114 stored by the load balancer 110 that receives the query if the entry requested does not exist in the DHTP 114 stored by the load balancer 110 that receives the query.

From operation 302, the method 300 can proceed to operation 304. At operation 304, the load balancer 110C can query the DHTP 114C stored by the load balancer 110C that received the query in operation 302. According to various embodiments, the load balancer 110C can determine if an entry that corresponds to a hash value associated with the packet 108 exists in the DHTP 114C stored by the load balancer 110C. If the DHTP 114C stored by the load balancer 110C includes an entry that corresponds to the hash value associated with the packet 108, the load balancer 110C can retrieve the entry. The entry can identify, inter alia, a path associated with the packet 108. It should be understood that this example is illustrative, and therefore should not be construed as being limiting in any way.

From operation 304, the method 300 can proceed to operation 306. At operation 306, the load balancer 110C can generate a response to the query received in operation 302. The response generated in operation 306 can correspond to an entry in the DHTP 114C, as explained above with reference to operation 304. The response also can indicate ownership of the path, in some embodiments. Thus, the response generated in operation 306 can include, among other things, data that identifies a path associated with the packet 108 and also can indicate, in some embodiments, ownership of the path. In some embodiments, the data corresponds to an entry and therefore can be inserted by a receiving load balancer 110 (e.g., the load balancer 110A or 110B in FIGS. 1A-1D) into a DHTP 114 (e.g., the DHTP 114A or 114B) stored by the receiving load balancer 110. Because the response can be formatted in additional and/or alternative manners, it should be understood that this example is illustrative, and therefore should not be construed as being limiting in any way.

From operation 306, the method 300 can proceed to operation 308. At operation 308, the load balancer 110C can send the response to the load balancer 110 from which the query was received in operation 302 (e.g., the load balancer 110A or 110B in FIGS. 1A-1D). From operation 308, the method 300 can proceed to operation 310. The method 300 can end at operation 310.

Figure 4:
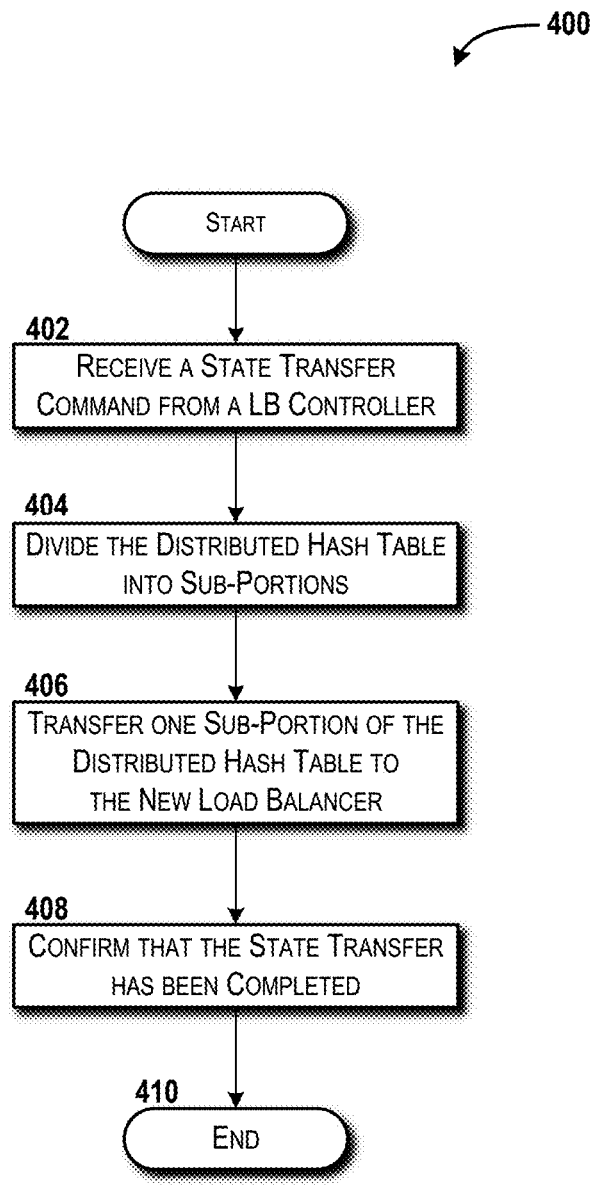
FIG. 4 is a flow diagram showing aspects of a method for updating a distributed hash table, according to an illustrative embodiment of the concepts and technologies described herein.

Turning now to FIG. 4, aspects of a method 400 for updating a distributed hash table 120 will be described in detail, according to an illustrative embodiment. For purposes of illustrating and describing the concepts of the present disclosure, the method 400 is described herein as being performed by the load balancer 110. It should be understood that additional and/or alternative devices and/or network nodes can provide the functionality described herein via execution of one or more modules, applications, and/or other software. Thus, the illustrated embodiments are illustrative, and should not be viewed as being limiting in any way.

Reference will be made in the description of the method 400 to the embodiments shown in FIGS. 1E-1G. Prior to the first operation 402 of the method 400, a computing environment 102 may be operating in a manner that is similar (or even identical) to the computing environment 102 shown in FIG. 1E. As shown in this example, the computing environment 102 can include three load balancers 110A-110C, and a new load balancer 110D can be added at some time. As explained above with reference to FIGS. 1A-1G, various implementations of the concepts and technologies disclosed herein include two load balancers 110, three load balancers 110, and/or more than three load balancers 110. Thus, the illustrated and described example embodiment should be understood as being illustrative and should not be construed as being limiting in any way. In response to detecting instantiation of this new load balancer 110D, the load balancer controller 118 can send a state transfer command to the load balancer 110C. It can be appreciated that more than one state transfer command can be sent in accordance with various embodiments of the concepts and technologies disclosed herein, and as such the illustrated embodiment is illustrative and should not be construed as being limiting in any way.

At some time before a state transfer occurs, it can be appreciated that the three previously existing load balancers 110A-110C (e.g., the load balancers 110 that were running before a new load balancer 110 was added) of the example embodiment being described can collectively host the entire distributed hash table 120. Furthermore, it can be appreciated that the load balancer 110D being added in this example embodiment can host no DHTP 114 at the time the load balancer 110D is instantiated. Again, it must be understood that any number of nodes (e.g., load balancers 110) may collectively host the distributed hash table 120.

In the example embodiment illustrated in FIG. 1E, the load balancer 110A can host a first DHTP 114A; the load balancer 110B can host a first DHTP 114B; and the load balancer 110C can host a first DHTP 114C. The first DHTP 114A can include data associated with a first range of hash keys; the second DHTP 114B can include data associated with a second range of hash keys; and the third DHTP 114C can include data associated with a third range of hash keys. For example, the first range can be defined as {K1-K100}, meaning entries with key values from 1-100 can be included in and/or represented by data stored by the load balancer 110A as the first DHTP 114A. Similarly, the second range can be defined as {K101-K200}, meaning entries with key values from 101-200 can be represented in the data stored by the load balancer 110B as the second DHTP 114B. Similarly, the third range can be defined as {K201-K300}, meaning entries with key values from 201-300 can be represented in the data stored by the load balancer 110C as the third DHTP 114C. It should be understood that this example is illustrative, and therefore should not be construed as being limiting in any way.

The method 400 begins at operation 402. At operation 402, a load balancer such as the load balancer 110C shown in FIG. 1E can receive a state transfer command from a load balancer controller 118 or other device that can control the two or more load balancers 110 of a particular implementation of the computing environment 102. According to various embodiments, the state transfer command received in operation 402 can be generated by the load balancer controller 118 (or other entity) in response to a scaling event.

The scaling event can correspond to the scaling of a load balancing function and/or of servers of a computing environment (e.g., the adding of a new instance of a load balancer 110). Because embodiments of the concepts and technologies disclosed herein can use a distributed hash table 120, with portions of the distributed hash table 120 being stored across multiple nodes such as the load balancers 110 as the distributed hash table portions 114, it can be appreciated that introduction of a new instance of a load balancer such as the load balancer 110D can prompt the load balancer controller 118 to re-divide and/or to redistribute the distributed hash table 120 across the load balancers 110 (including the newly added load balancer such as the load balancer 110D), or to initiate the re-division and/or redistribution of the distributed hash table 120. Thus, embodiments of the concepts and technologies disclosed herein can include functionality for the load balancer controller 118 sending state transfer commands to one or more load balancers 110 to effect redistribution of the distributed hash table 120. Thus, operation 402 can correspond to this state transfer command being received by one of the previously existing load balancers 110 such as the load balancer 110C in the example shown in FIG. 1E. It should be understood that this example is illustrative, and therefore should not be construed as being limiting in any way.

From operation 402, the method 400 can proceed to operation 404. At operation 404, the load balancer 110 that received the state transfer command in operation 402 (e.g., the load balancer 110C in the example shown in FIG. 1E) can divide a DHTP 114 (e.g., the DHTP 114C in the example shown in FIG. 1E) stored by that load balancer 110 into two or more portions. As explained above, in the embodiment illustrated and described herein, the third range associated with the DHTP 114C stored by the load balancer 110C can be defined as {K201-K300}, meaning entries with key values from 201-300 are represented in the data stored by the load balancer 110C in the third DHTP 114C. It should be understood that this example is illustrative, and therefore should not be construed as being limiting in any way.

In this example, embodiment, the load balancer 110 that receives the state transfer command (e.g., the load balancer 110C) can be configured to divide its DHTP 114C into two equal or unequal portions. For example, the load balancer 110C can divide the DHTP 114C into two sub-portions of the distributed hash table (hereinafter collectively and/or generically referred to as "sub-portions") 122A and 122B. The first sub-portion 122A can have a sub-range defined, for example, as {K201-K250}, meaning entries with key values from 201-250 can be included in the first sub-portion 122A. This example embodiment is illustrated in FIG. 1F.

The second sub-portion 122B can have a sub-range defined, for example, as {K251-K300}, meaning entries with key values from 251-300 can be included in the second sub-portion 122B. It should be understood that these example sub-portions are illustrative, and therefore should not be construed as being limiting in any way. In particular, the DHTP 114C stored by the load balancer 110C (or any other load balancer 110 that receives a state transfer command) can be divided into any number (two or more) sub-portions such as the sub-portions 122A and 122B.

From operation 404, the method 400 can proceed to operation 406. At operation 406, the load balancer 110 that divided its DHTP 114 (e.g., the load balancer 110C in the example shown in FIGS. 1E-1F) into sub-portions in operation 404 can transfer one sub-portion to the newly instantiated load balancer 110 (e.g., the load balancer 110D as shown in the example in FIGS. 1E-1F). It can be appreciated that the load balancer 110 (e.g., the load balancer 110C in the example shown in FIGS. 1E-1F) can maintain one of the sub-portions created in operation 404 for itself.

From operation 406, the method 400 can proceed to operation 408. In operation 408, the load balancer 110 that transferred a sub-portion of its DHTP 114 (e.g., the load balancer 110C in the example shown in FIGS. 1E-1F) to the newly instantiated load balancer 110 (e.g., the load balancer 110D as shown in the example in FIGS. 1E-1F) can confirm that the state transfer has been completed. In some embodiments, the load balancer 110C can send a confirmation to the load balancer controller 118 to confirm that this operation has been completed. It should be understood that this example is illustrative, and therefore should not be construed as being limiting in any way.

As shown in FIG. 1F, the load balancer controller 118 can be configured to inform the other load balancers 110 of the newly added load balancer 110D, as well as details of the new distribution and/or division of the distributed hash table 120 across the load balancers 110. Thus, the load balancers 110 can be updated so that the load balancers 110 will have a current knowledge of how the key ranges are associated with each of the now-existing load balancers 110. Thus, each load balancer 110 can know which of the load balancers 110 to query when a new packet 108 is received. It should be understood that this example is illustrative, and therefore should not be construed as being limiting in any way.

From operation 408, the method 400 can proceed to operation 410. The method 400 can end at operation 410.

Figure 5:
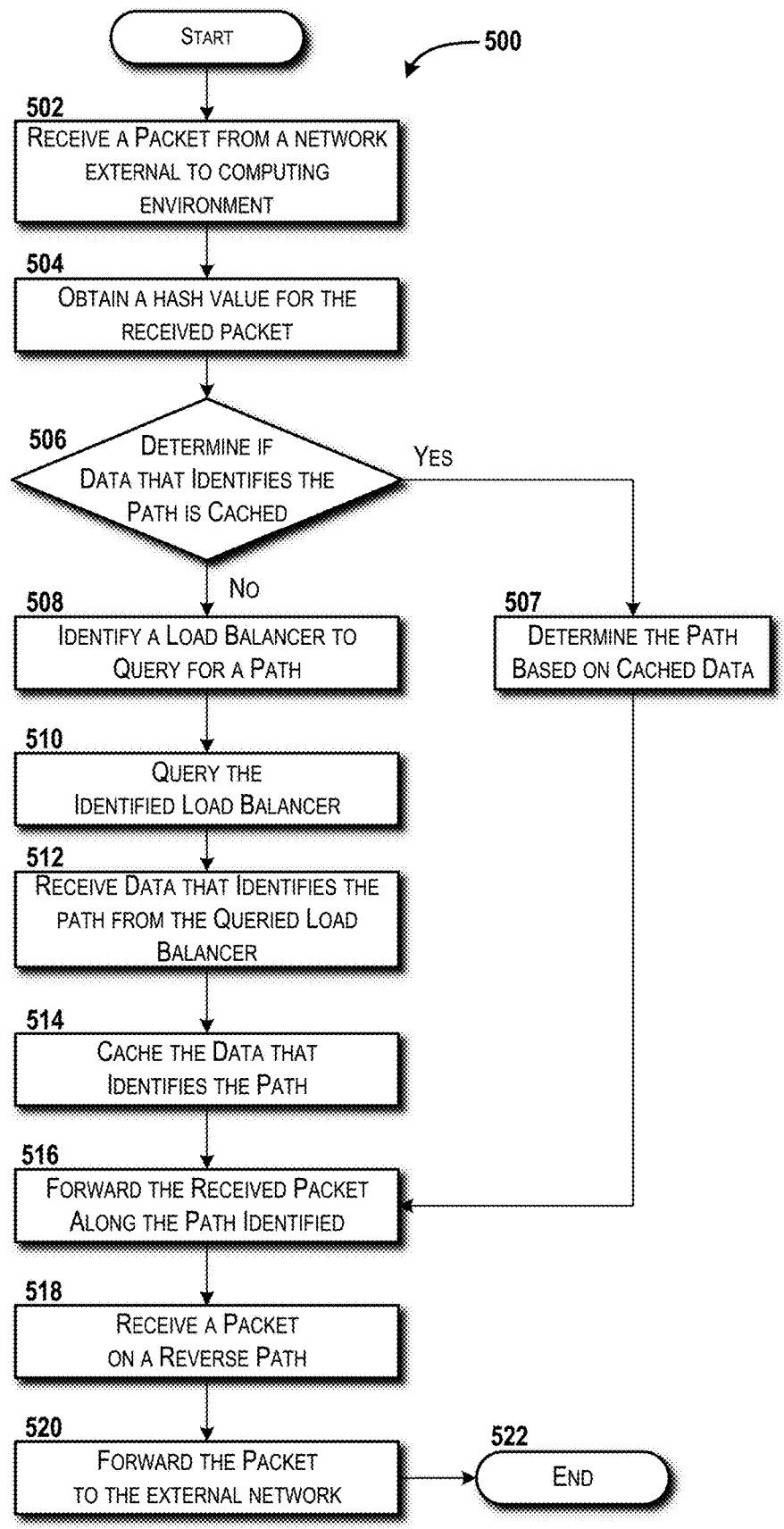
FIG. 5 is a flow diagram showing aspects of a method for providing a distributed stateful load balancer in a split hardware and software implementation, according to an illustrative embodiment of the concepts and technologies described herein.

Turning now to FIG. 5, aspects of a method 500 for providing a distributed stateful load balancer in a split hardware and software implementation, such as illustrated in FIG. 1H, will be described, according to an illustrative embodiment. For purposes of illustrating and describing the concepts of the present disclosure, the method 500 is described herein as being performed by the gateway/load balancer 128 (introduced in FIG. 1I) in the hardware implementation 126. It should be understood that any of the gateway/load balancers 128A-128B (as shown in FIG. 1M; and others not shown) can perform the method 500, according to various embodiments. For purposes of clarifying the concepts and technologies disclosed herein, the example implementations illustrated in FIGS. 1H-1M will be referred to when describing the operations of FIG. 5. The method 500 will be described as being performed by the gateway/load balancer 128, in accordance with the example shown in FIGS. 1I-1L. Because other gateway/load balancers 128 in the hardware implementation 126 can perform some or all of the operations illustrated and described herein, it should be understood that the illustrated embodiment is illustrative, and should not be viewed as being limiting in any way.

The method 500 begins at operation 502, where the gateway/load balancer 128 can receive a packet 108 from a network external to the computing environment, for example the network 104. From operation 502, the method 500 proceeds to operation 504, where the gateway/load balancer 128 can obtain a hash value for the received packet 108. In some embodiments, the gateway/load balancer 128 can generate a hash value for the packet 108 and forward that hash value along with the packet 108 to the load balancer 110B (see FIG. 1I). In some other embodiments, the gateway/load balancer 128 can forward the packet 108 to the load balancer 110B, and the load balancer 110B can generate the hash value. Regardless of how the hash value is generated, it can be understood that the load balancer 110 that receives the packet 108 can also obtain a hash value associated with the packet 108.

From operation 504, the method 500 can proceed to operation 506. At operation 506, the gateway/load balancer 128 can determine if data that identifies the path associated with the packet 108 is cached by the gateway/load balancer 128 (i.e., stored in the cache 112 of the gateway/load balancer 128). As explained above, and as will be explained in more detail below with reference to operation 514, the gateway/load balancer 128 can be configured to store data that identifies paths in its cache 112. In particular, if the gateway/load balancer 128 receives a packet 108 and does not own the path associated with the packet 108 and/or recognizes that another load balancer 110 stores a DHTP 114 that identifies the path associated with the packet, the gateway/load balancer 128 can query that load balancer 110 and obtain data that identifies the path. This data can be stored by the gateway/load balancer 128 in its cache 112 so that when a future/subsequent packet 108 associated with the particular path is received, the gateway/load balancer 128 can determine the path for that packet 108 via a search of its cache 112. This obviates the need to identify another load balancer 110 that stores data identifying the path, querying that identified load balancer 110, and receiving the data that identifies the path. In this manner, the software implementation 124 of the load balancers 110 can by bypassed completely for the future/subsequent packet(s) 108. This is best shown in FIG. 1J.

Thus, it can be appreciated that the caching of the data that identifies the path can result in improved efficiency of systems in accordance with various embodiments of the concepts and technologies disclosed herein. Namely, such a system can reduce its local processing operations (e.g., to identify the load balancer 110 to query) and network usage (e.g., by sending queries to and/or receiving responses from the identified load balancer 110). Thus, if the gateway/load balancer 128 determines, in operation 506, that the cache 112 stores data that identifies a path associated with the packet 108 received in operation 202, this can indicate that a previous packet 108 has been received by the gateway/load balancer 128 and operations for obtaining the data identifying the path previously were performed. Thus, subsequent received packets 108 in a particular session can be forwarded by the gateway/load balancer 128 directly to the endpoint (e.g., server Y 116B in FIG. 1J) without identifying other load balancers 110 and/or communicating with those load balancers 110, thereby improving efficiency of the split hardware and software implementation of a distributed stateful load balancer. It should be understood that this example is illustrative, and therefore should not be construed as being limiting in any way.

If the gateway/load balancer 128 determines, in operation 506, that data identifying a path associated with the packet 108 is stored in the cache 112, the method 500 can proceed to operation 507. At operation 507, the gateway/load balancer 128 can determine the path based on the cached data. Thus, as noted above, the gateway/load balancer 128 can determine the path for the packet 108 received in operation 502 without: a) identifying the load balancer 110 that stores a DHTP 114 that stores the data identifying the path associated with the packet 108; b) querying the identified load balancer 110 for the data that identifies the path associated with the packet 108; and/or c) receiving, from the identified load balancer 110, the data that identifies the path associated with the packet 108.

If the gateway/load balancer 128 determines, in operation 506, that data identifying the path associated with the packet 108 is not stored in the cache 112, the method 500 can proceed to operation 508. At operation 508, the gateway/load balancer 128 can identify, among multiple load balancers 110 (including itself), a load balancer 110 to query to identify a path associated with the packet 108 received in operation 502. In operation 508, therefore, the gateway/load balancer 128 can determine that it does not own the path associated with the packet 108 received in operation 502 and that another load balancer 110 will be queried to determine ownership of the path. In the example implementation shown in FIG. 1I, the load balancer 110B is queried by the gateway/load balancer 128. As such, this example implementation will be used in the description of the method 500 for clarity.

According to various embodiments of the concepts and technologies disclosed herein, the gateway/load balancer 128 can identify the load balancer 110 to query based on the hash value obtained in operation 504. In particular, the gateway/load balancer 128 can store data that identifies hash value ranges (hash ranges) associated with each of the DHTPs 114 stored by the load balancers 110 in the software implementation 124. For a particular hash value, e.g., the hash value obtained in operation 504, the gateway/load balancer 128 can determine which DHTP 114 includes a range in which the hash value falls or fits, and the based on this determination, the gateway/load balancer 128 can identify the load balancer 110B (in the illustrated example shown in FIG. 1I) to query for the path. Because the identification of the owner of a DHTP 114 is understood, this will not be further discussed herein.

From operation 508, the method 500 can proceed to operation 510. At operation 510, the gateway/load balancer 128 can query the load balancer 110B (or other load balancer 110 as identified in operation 508). The query generated and/or transmitted in operation 510 can be generated and/or transmitted for the purpose of identifying the path for the packet received in operation 502. The query can include two portions of data. A first portion of the query can inquire as to the path associated with the packet 108 received in operation 502. A second portion of the query can instruct the receiving load balancer 110B (i.e., the load balancer 110 that is receiving the query sent in operation 510) to insert an entry in the DHTP 114B stored by the load balancer 110B if an entry does not exist in the DHTP 114B. Thus, embodiments of the concepts and technologies disclosed herein can reduce traffic among and/or between the load balancers 110 by enabling the insertion of entries in a DHT 120 and/or portions thereof such as the DHTPs 114 if no such entry is determined to exist. It should be understood that this example is illustrative, and therefore should not be construed as being limiting in any way.

From operation 510, the method 500 can proceed to operation 512. At operation 512, the gateway/load balancer 128 can receive response from the queried load balancer 110B. The response received in operation 512 can include data that identifies the path. In some embodiments, the response also can include data that instructs the gateway/load balancer 128 to store the data identifying the path in its cache 112. As shown in the example implementation shown in FIG. 1I, the gateway/load balancer 128 can be informed by the response that the path for the packet 108 is to the server Y 116B. Because the data received in operation 512 can be formatted in other ways and/or can indicate other paths and/or ownerships, it should be understood that this example is illustrative, and therefore should not be construed as being limiting in any way.

From operation 512, the method 500 can proceed to operation 514. At operation 514, the gateway/load balancer 128 can cache the data that identifies the path and/or ownership as received in operation 512. According to various embodiments, the gateway/load balancer 128 can store the data in the cache 112. According to various embodiments of the concepts and technologies disclosed herein, the data stored in the cache 112 can be stored for a time t. In various embodiments, the time t can correspond to a lifetime of the connection associated with the packet 108. In some other embodiments, the time t can be determined based on settings, preferences, and/or other considerations. It should be understood that this example is illustrative, and therefore should not be construed as being limiting in any way. Additional details in this regard will be described herein below with reference to FIG. 6.

The caching of the data that identifies the path and/or ownership can be used to improve efficiency of the computing environment 102 by reducing lookups and/or queries for future/subsequent packets 108. It should be understood that this example is illustrative, and therefore should not be construed as being limiting in any way.

From operation 514, the method 500 can proceed to operation 516. The method 500 also can proceed to operation 516 from operation 507. At operation 516, the gateway/load balancer 128 can forward the packet 108 along the path identified. Thus, the gateway/load balancer 128 can forward the packet 108 to the recipient identified by the path (e.g., the server Y 116B as shown in the example implementation shown in FIG. 1I). The packet 108 can include headers that identify the gateway/load balancer 128, as generally is understood. Thus, the server or other network element that receives the packet 108 can be configured to send subsequent packets to the gateway/load balancer 128. It should be understood that this example is illustrative, and therefore should not be construed as being limiting in any way.

From operation 516, the method 500 can proceed to operation 518. At operation 518, the gateway/load balancer 128 can receive a packet on a reverse path from the server 116B (best shown in FIG. 1J) that bypasses the other load balancers 110 in the software implementation 124. For example, the server 116B can receive the packet 108 forwarded in operation 516, and respond with a subsequent packet that arrives at the gateway/load balancer 128 in operation 518. The gateway/load balancer 128 can examine its cache 112 and can determine, based on that examination, that the subsequent packet is to be forward to the network 104. From operation 518, the method 500 can proceed to operation 520. At operation 520, the gateway/load balancer 128 can forward the packet to the network 104.

According to various embodiments, the forwarding of the subsequent packet as described in operations 516 and 518 can be performed by the gateway/load balancer 128. Prior to performance of the operation 502, a path as shown in FIGS. 1I-1J can have existed, and the gateway/load balancer 128 can have already stored, in its cache 112 data that identifies the path. As such, it should be understood that this example is illustrative, and therefore should not be construed as being limiting in any way.

From operation 520, the method 500 can proceed to operation 522. The method 500 can end at operation 522.

Figure 6:
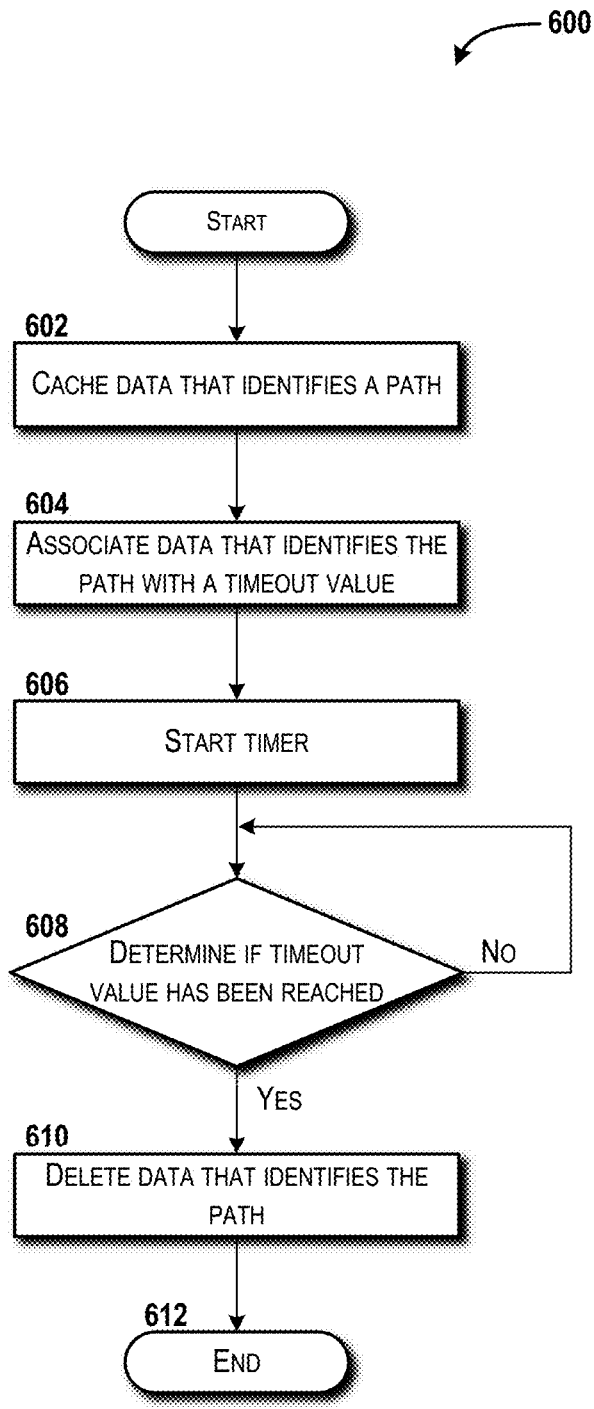
FIG. 6 is a flow diagram showing aspects of a method for automatically deleting data that identifies a path from a cache of a hardware node, according to an illustrative embodiment of the concepts and technologies described herein.

Turning now to FIG. 6, a flow diagram showing aspects of a method 600 for automatically deleting data that identifies a path from a cache 112 of a hardware node, such as the gateway/load balancer 128, will be described according to an illustrative embodiment of the concepts and technologies described herein. According to various embodiments of the concepts and technologies disclosed herein, the data stored in the cache 112 can be stored for a time t. When the time t is reached, cached data times out and is automatically deleted from the cache 112. In various embodiments, the time t can correspond to a lifetime of the connection associated with the packet 108. In some other embodiments, the time t can be determined based on settings, preferences, and/or other considerations. It should be understood that this example is illustrative, and therefore should not be construed as being limiting in any way.

The method 600 will be described with reference to FIGS. 1I-1M and as being performed by the gateway/load balancer 128. The method 600 begins and proceeds to operation 602. At operation 602, the gateway/load balancer 128 can cache data that identifies a path. The cached data is stored in the cache 112 associated with the gateway/load balancer 128.

From operation 602, the method 600 proceeds to operation 604. At operation 604, the gateway/load balancer 128 can associate the data cached in operation 602 with a timeout value (e.g., time t). The timeout value can be determined based on settings, preferences, and/or other considerations. From operation 604, the method 600 proceeds to operation 606. At operation 606, the gateway/load balancer 128 can start a timer for the data cached in operation 602. The timer is set to timeout when the timer reaches the timeout value (e.g., the time t). From operation 606, the method 600 proceeds to operation 608. At operation 608, the gateway/load balancer 128 can determine if the timeout value has been reached. If, in operation 608, the gateway/load balancer 128 determines that the timeout value has not been reached, the method 600 can wait until the timeout value has been reached by reverting back to operation 608. If, however, in operation 608, the gateway/load balancer 128 can determine that the timeout value has been reached, the method 600 can proceed to operation 610 where the gateway/load balancer 128 deletes the data cached in operation 602.

From operation 610, the method 600 can proceed to operation 612. The method 600 can end at operation 612.

Figure 7:
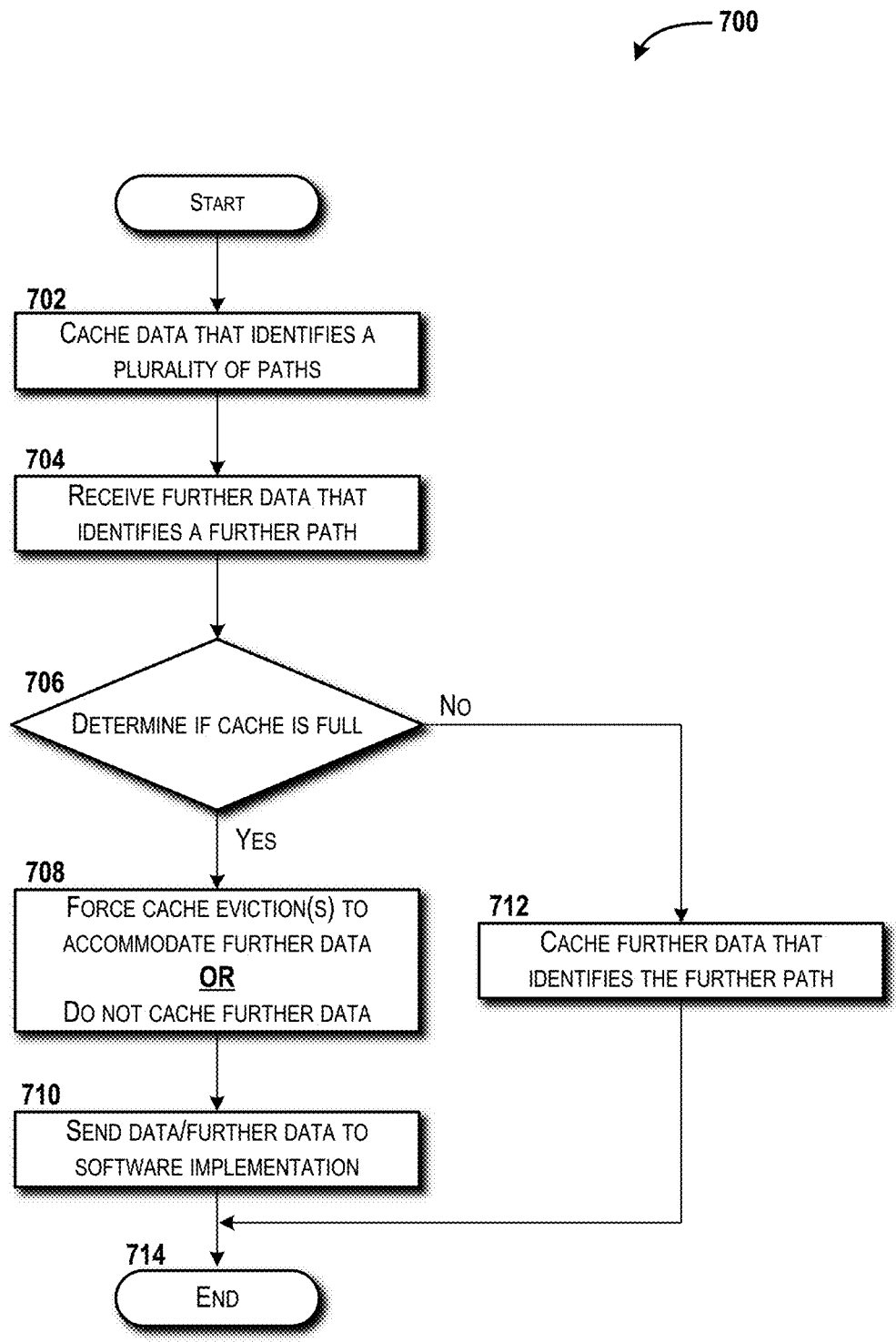
FIG. 7 is a flow diagram showing aspects of a method for handling a full cache of a hardware node, according to an illustrative embodiment of the concepts and technologies described herein.

Turning now to FIG. 7, a flow diagram showing aspects of a method 700 for handling a full cache of a hardware node, such as the cache 112 of the gateway/load balancer 128, will be described according to an illustrative embodiment of the concepts and technologies described herein. The method 700 will be described with reference to FIGS. 1I-1M and as being performed by the gateway/load balancer 128. The method 700 begins and proceeds to operation 702. At operation 702, the gateway/load balancer 128 can cache, in the cache 112, data that identifies a plurality of paths. From operation 702, the method 700 proceeds to operation 704, where the gateway/load balancer 128 can receive further data that identifies a further path.

From operation 704, the method 700 proceeds to operation 706. At operation 706, the gateway/load balancer 128 can determine if the cache 112 is full. If, at operation 706, the gateway/load balancer 128 determines that the cache 112 is full, the method 700 proceeds to operation 708. At operation 708, the gateway/load balancer 128 can force one or more cache evictions to accommodate the further data. Alternatively, at operation 708, the gateway/load balancer 128 does not cache the further data. The gateway/load balancer 128 can determine whether to force one or more cache evictions to create storage space to accommodate the further data or not to cache the further data. This determination can be based on settings, preferences, and/or other considerations. From operation 708, the method can proceed to operation 710. At operation 710, the gateway/load balancer 128 can send the data/further data to the software implementation 124 of the load balancers 110. If, at operation 706, the gateway/load balancer 128 determines that the cache 112 is not full, the method 700 proceeds to operation 712. At operation 712, the gateway/load balancer 128 can cache the further data that identifies the further path.

From operation 710 or operation 712, the method 700 proceeds to operation 714. The method 700 can end at operation 714.

Figure 8A:
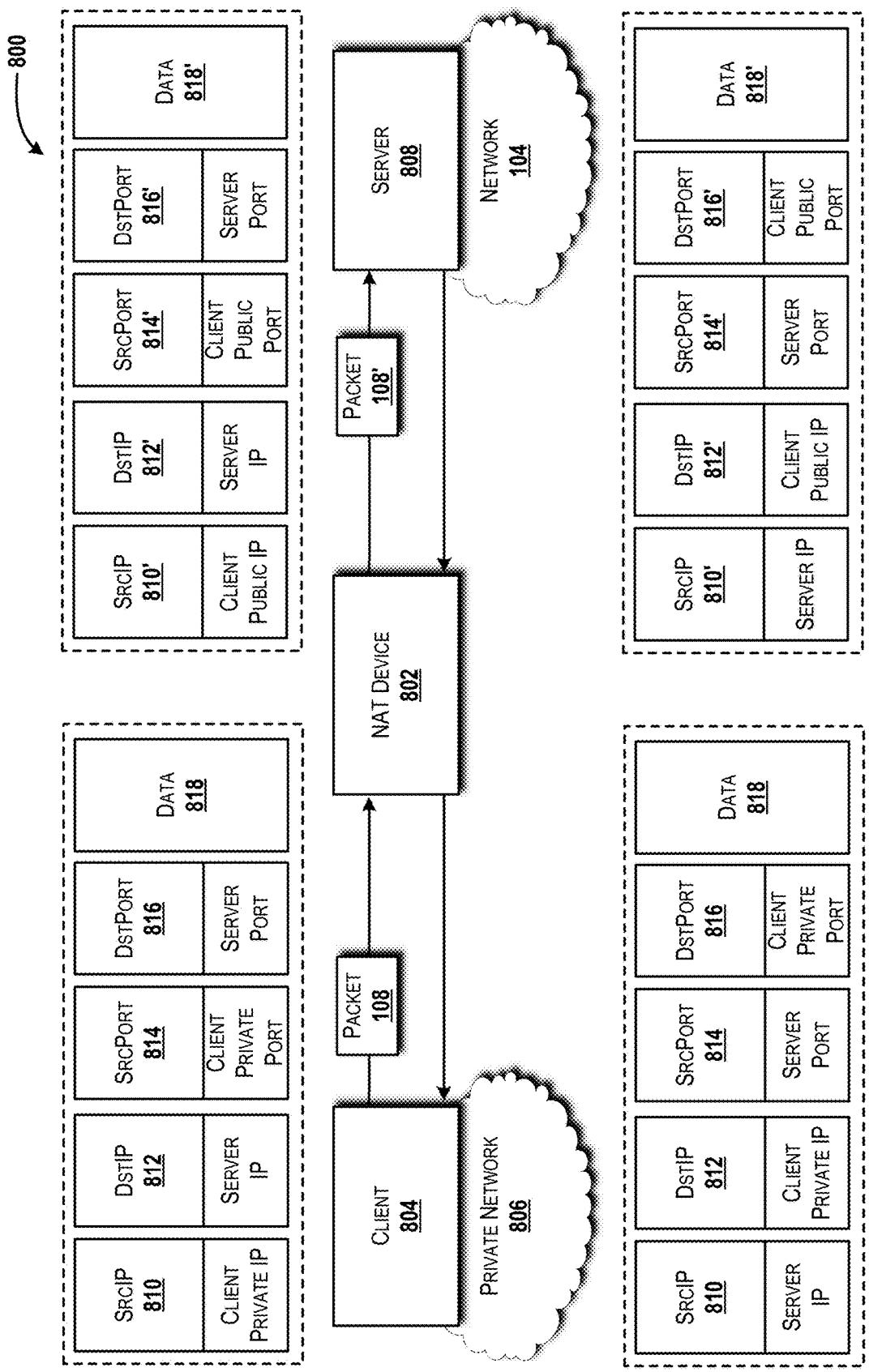
FIG. 8A is a system diagram illustrating aspects of a traditional network address translation ("NAT") system.

Turning now to FIG. 8A, an operating environment 800 in which a traditional network address translation ("NAT") device 802 is deployed will be described. The NAT device 802 can be implemented as part of a router, firewall, switch, or other network function. The NAT device 802 alternatively can be dedicated to providing NAT. The NAT device 802 is illustrated as providing static NAT, but can be configured to provide, additionally or alternatively, dynamic NAT and/or NAT overload. The NAT device 802 can receive packets 108 from one or more client devices ("client") 804, such as a computer, tablet, mobile device, or other IP-connected device. The client 804 resides in a private network 806. The client 804 seeks to establish a connection to a server 808 operating in the network 104.

In the illustrated example, the contents of the packets 108 of a connection from the client 804 to the NAT device 802 are simplified for ease of explanation, and as such, can include a source IP 810 equal to the client's private IP address, a destination IP 812 equal to the server's IP address, a source port 814 equal to the client's private port, a destination port 816 equal to the server's port, and other data 818. The NAT device 802 can process the packet 108 to change the source IP address 810 from the client's private IP address to the client's public IP address and to change the source port 814 from the client's private port to the client's public port as shown in the packet 108' sent to the network 104.

The public IP and port are chosen by the NAT device 802 and are unique across all connections from all clients, such as the client 804. The NAT device 802 supports bidirectional flow of traffic for a connection. As such, a packet 108' of the connection from the network 104 can be received at the NAT device 802. In the illustrated example, the contents of the packet 108' are simplified for ease of explanation, and as such, can include a source IP 810' equal to the server's IP address, a destination IP 812' equal to the client's public IP address, a source port 814' equal to the server's port, a destination port 816' equal to the client's public port, and other data 818'. The NAT device 802 can do a reverse mapping on the packet 108' before sending the packet 108 to the client 804. Specifically, the NAT device 802 can map the client's public IP port to the client's private IP and client's public port to the client's private port.

Figure 8B:
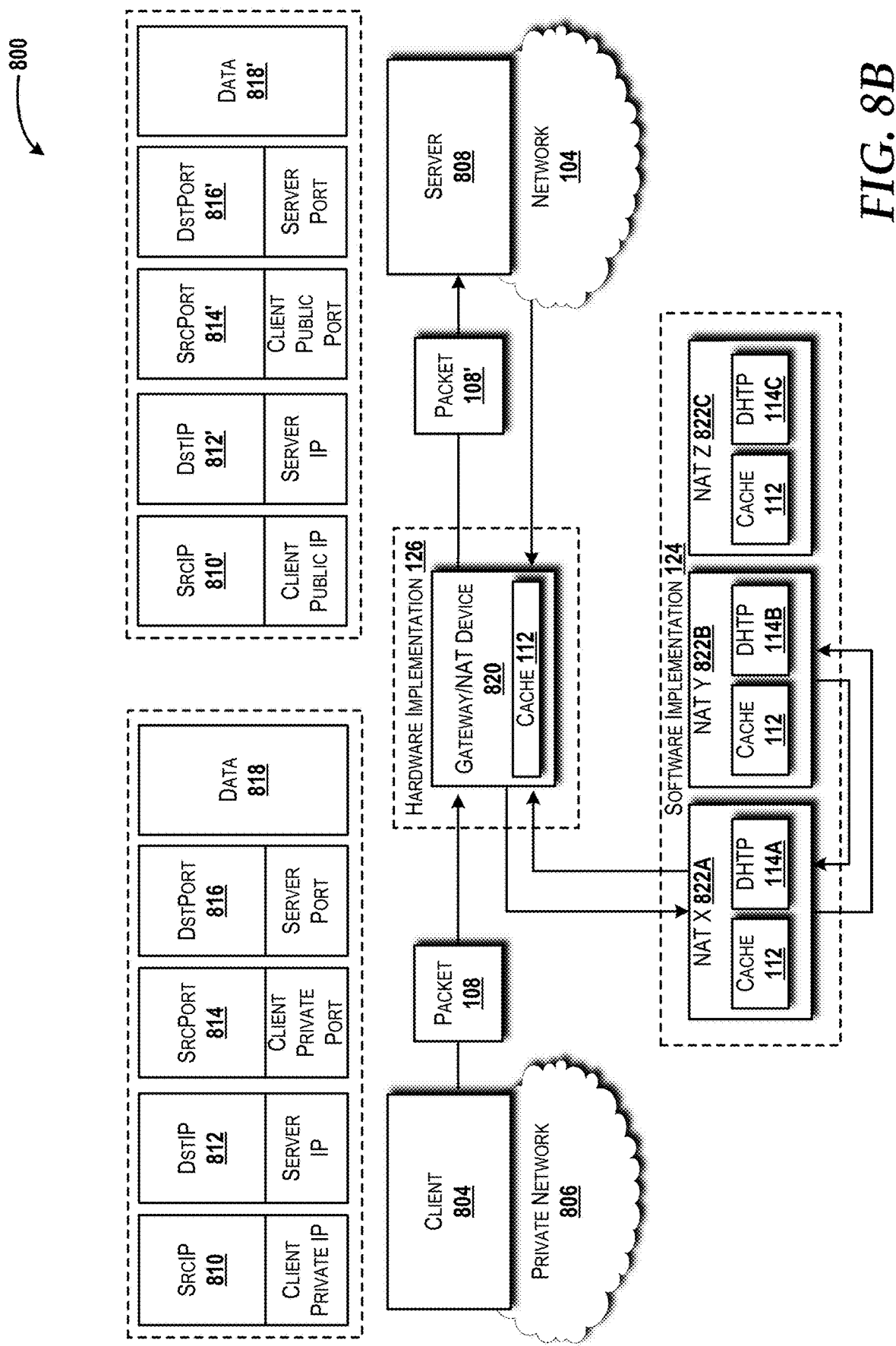
FIGS. 8B-8D are system diagrams illustrating aspects of an illustrative operating environment in which aspects of the concepts and technologies disclosed herein can be applied to a NAT system.
Figure 8C:
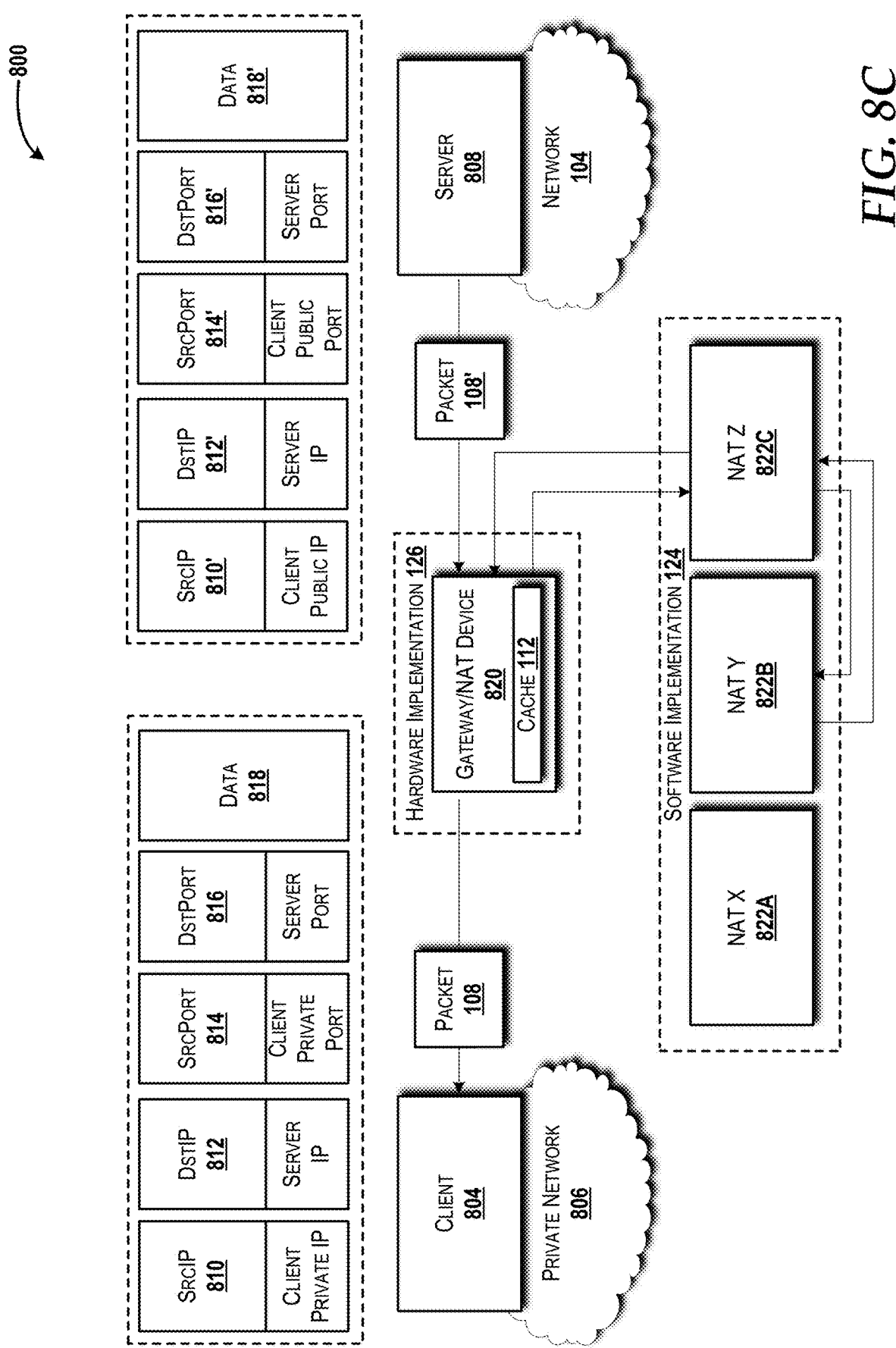
Figure 8D:
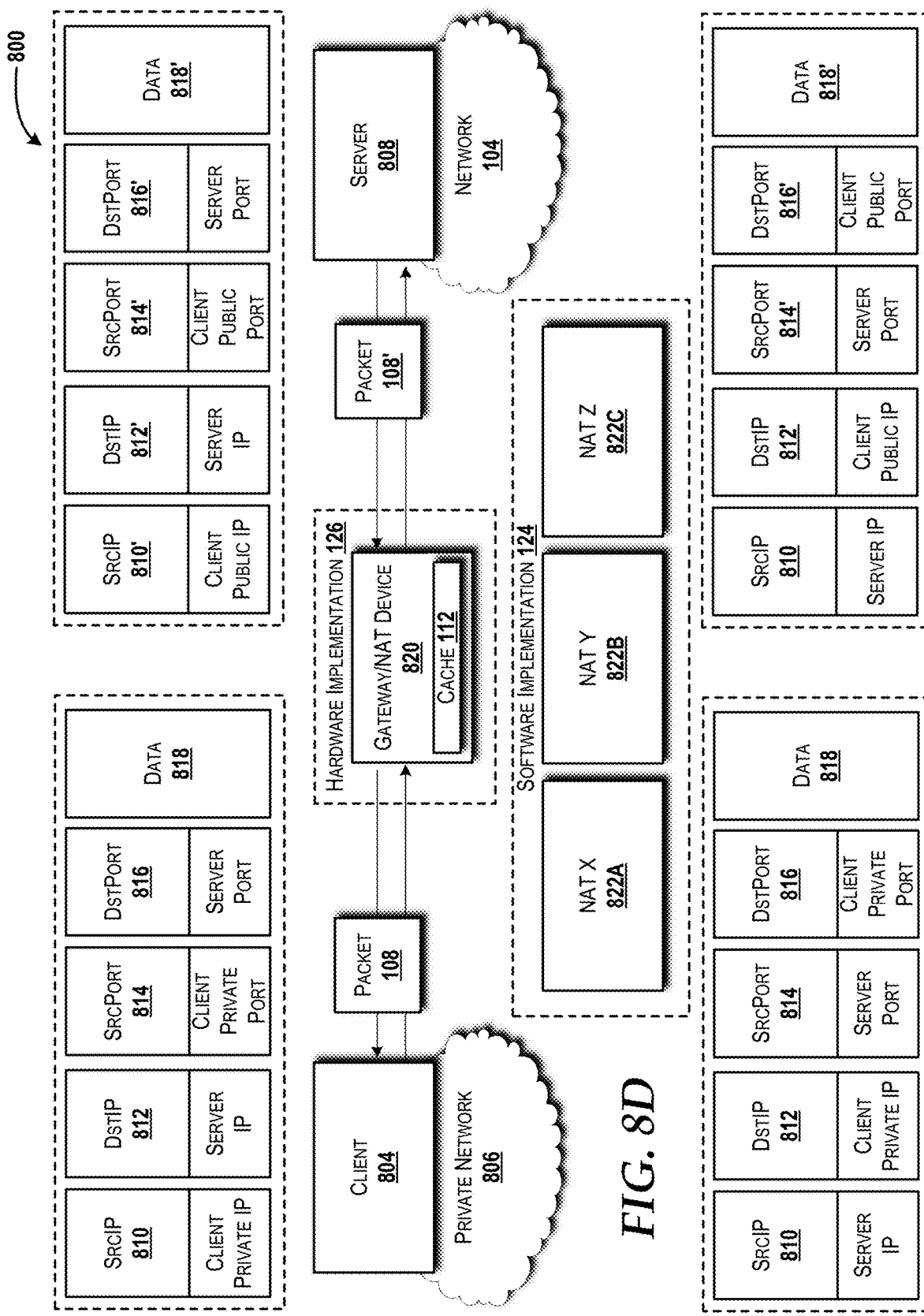

Turning now to FIGS. 8B-8D, the operating environment 800 is again shown but with the functionality of the NAT device 802 partitioned into a software implementation 124 and a hardware implementation 126. The hardware implementation 126 includes hardware-implemented gateway and NAT functions shown as gateway/NAT device 820. The software implementation 124 includes software-implemented NAT functions—NAT X 822A, NAT Y 822B, and NAT Z 822C. These software-implemented NAT functions are in communication with the gateway/NAT device 820. Similar to the hardware implementation 126 described above with reference to FIGS. 1H-1M, the hardware implementation 126 of a network function (in this example the gateway/NAT device 820) can include a cache 112. The NATs 822A-822C in the software implementation 124 each include a cache 112 and a DHTP 114 similar to the load balancers 110 shown in the software implementation 124 introduced in FIG. 1H. The packet 108 before NAT processing and the packet 108' after NAT processing are also shown as above in FIG. 8A.

FIG. 8B illustrates how a first/initial packet 108 of a connection is processed from the client 804 to the network 104. When the client's packet 108 reaches the gateway/NAT device 820, the gateway/NAT device 820 sends a query packet (similar to WhoOwns) to a software NAT function, such as the NAT X 822A in the illustrated example, to determine the mapping from the client's private IP and port to its public IP and port. Similar to the case of a load balancer, the software NAT functions, such as the NATs 822A-822C, can implement and maintain a DHTP 114A-114C, respectively, to store the flow entry for each connection. But, in case of a NAT, the DHTP 114 can store two entries for each connection. The first entry maps the client's private IP and port to its public IP and port. The second entry maps the client's public IP and port to its private IP and port. Both of these entries are created upon the arrival of the first packet 108 of a connection. The DHTP 114 stores each entry at the respective owner node. As before, the owner is determined by the hash of the key of the entry. The owners of the two entries may be different and is shown in FIG. 8B where the first entry is stored at the NAT X 822A and the second entry is stored at the NAT Y 822B. Once the NAT entries are created, the software NAT processes the packet 108 by modifying the client's private IP and port to its public IP and port. Then, it sends the packet 108 and also the mapping from the client's private IP and port to its public IP and port to the gateway/NAT device 820. The gateway/NAT device 820 NAT can store the mapping in its cache 112 and can forward the packet 108' to the network 104.

FIG. 8C illustrates how a packet 108' is processed from the network 104 to the client 804. The packet 108' is received at the gateway/NAT device 820 and contains a source IP and source port of the server 808. The destination IP and port of the packet 108' are the client's public IP and public port for this connection. The gateway/NAT device 820 can send a query packet to a software NAT function, such as the NAT Z 822C in the illustrated example, to determine the mapping from the client's public IP and port to its private IP and port. This corresponding flow entry already exists in the DHTP 114 implemented by the software NATs. The entry is read by the NAT Z 822C using a DHT query and response. The NAT Z 822C processes the packet 108' by modifying the client's public IP and port for this connection to its private IP and port. Then, the NAT Z 822C sends the packet 108' and also the mapping from the client's public IP and port to its private IP and port to the gateway/NAT device 820. The gateway/NAT device 820 can store the mapping in its cache 112 and can forward the packet 108 to the client 804.

FIG. 8D illustrates how subsequent packets 108 can be processed in either direction (i.e., the client 804 to the network 104 or the network 104 to the client 804). At this point, the gateway/NAT device 820 has cached both entries for the connection. Hence, any subsequent packets in the connection sent by the client 804 to the server 808 in the network 104 can be processed by the gateway/NAT device 820 itself. The gateway/NAT device 820 processes the packet 108 by modifying the client's private IP and port to its public IP and port. Then, the gateway/NAT device 820 sends the packet 108' to the server 808 in the network 104. The gateway/NAT device 820 processes any subsequent packets 108' in the connection sent by the server 808 to the client 804 in a similar manner. It should be understood that the gateway/NAT device 820 may not require any interaction with the software NAT functions 822A-822C in processing subsequent packets 108/108' in either direction. This would substantially reduce the load on the software NAT functions 822A-822C. In doing so, the design uses the high forwarding capacity of the gateway/NAT device 820, which typically is of the order of terabits/sec. In comparison, a single software NAT function 822 has a forwarding capacity of tens of gigabits per second, which is 100 times smaller than a hardware-based NAT gateway. Thus, it can be possible that a single NAT gateway can replace up to a hundred software NAT functions. This design can bring a vast reduction in cost for NAT devices.

Figure 9:
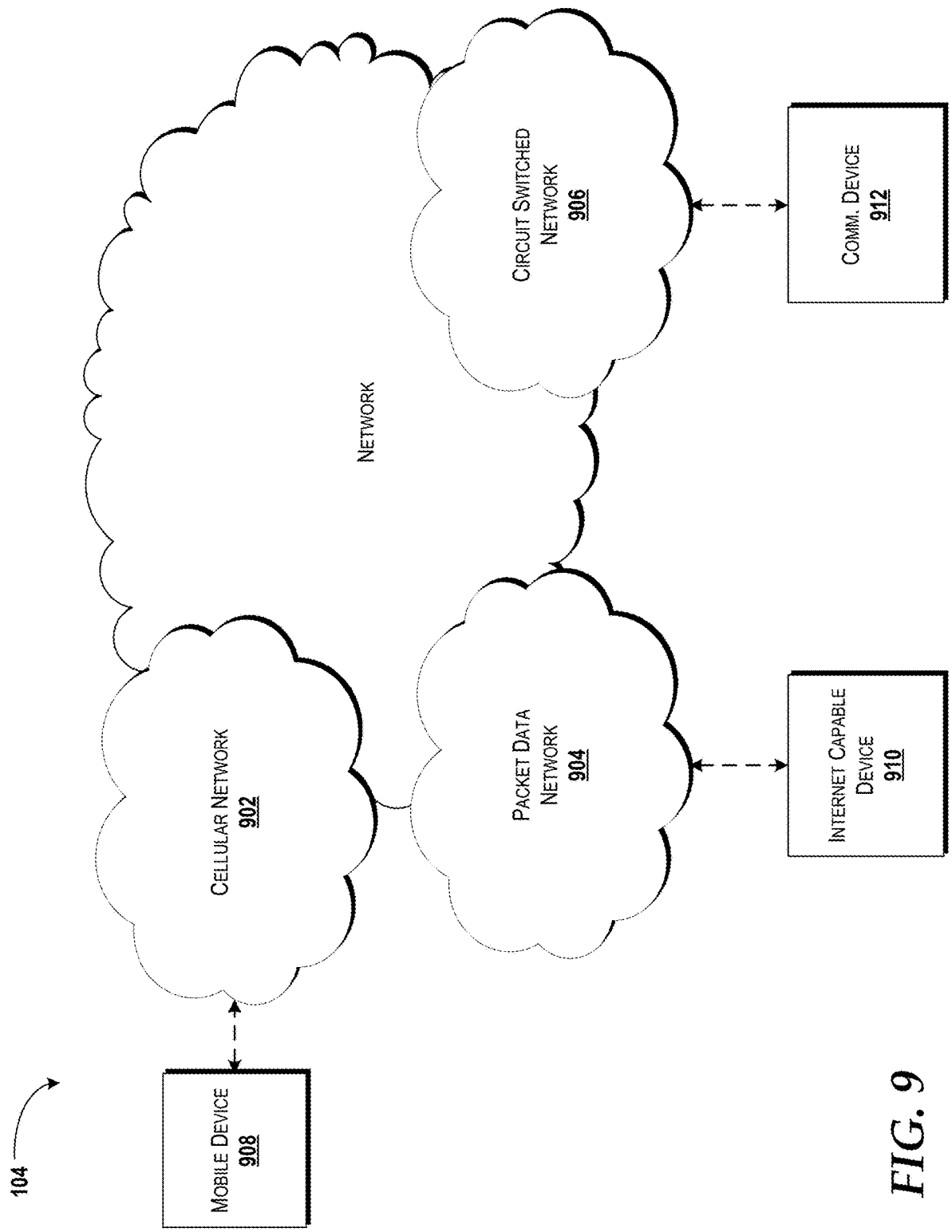
FIG. 9 schematically illustrates a network, according to an illustrative embodiment of the concepts and technologies described herein.

Turning now to FIG. 9, additional details of the network 104 are illustrated, according to an illustrative embodiment. The network 104 includes a cellular network 902, a packet data network 904, for example, the Internet, and a circuit switched network 906, for example, a publicly switched telephone network ("PSTN"). The cellular network 902 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 902 also includes radios and nodes for receiving and transmitting voice, data, and combinations thereof to and from radio transceivers, networks, the packet data network 904, and the circuit switched network 906.

A mobile communications device 908, such as, for example, a cellular telephone, a user equipment, a mobile terminal, a PDA, a laptop computer, a handheld computer, and combinations thereof, can be operatively connected to the cellular network 902. The cellular network 902 can be configured as a 2G GSM network and can provide data communications via GPRS and/or EDGE. Additionally, or alternatively, the cellular network 902 can be configured as a 3G UMTS network and can provide data communications via the HSPA protocol family, for example, HSDPA, EUL (also referred to as HSUPA), and HSPA+. The cellular network 902 also is compatible with 4G mobile communications standards as well as evolved and future mobile standards.

The packet data network 904 includes various devices, for example, servers, computers, databases, and other devices in communication with one another, as is generally known. The packet data network 904 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 904 includes or is in communication with the Internet. The circuit switched network 906 includes various hardware and software for providing circuit switched communications. The circuit switched network 906 may include, or may be, what is often referred to as a plain old telephone system (POTS). The functionality of a circuit switched network 906 or other circuit-switched network are generally known and will not be described herein in detail.

The illustrated cellular network 902 is shown in communication with the packet data network 904 and a circuit switched network 906, though it should be appreciated that this is not necessarily the case. One or more Internet-capable devices 910, for example, a PC, a laptop, a portable device, or another suitable device, can communicate with one or more cellular networks 902, and devices connected thereto, through the packet data network 904. It also should be appreciated that the Internet-capable device 910 can communicate with the packet data network 904 through the circuit switched network 906, the cellular network 902, and/or via other networks (not illustrated).

As illustrated, a communications device 912, for example, a telephone, facsimile machine, modem, computer, or the like, can be in communication with the circuit switched network 906, and therethrough to the packet data network 904 and/or the cellular network 902. It should be appreciated that the communications device 912 can be an Internet-capable device, and can be substantially similar to the Internet-capable device 910. In the specification, the network 104 is used to refer broadly to any combination of the networks 902, 904, 906. It should be appreciated that substantially all of the functionality described with reference to the network 104 can be performed by the cellular network 902, the packet data network 904, and/or the circuit switched network 906, alone or in combination with other networks, network elements, and the like.

Figure 10:
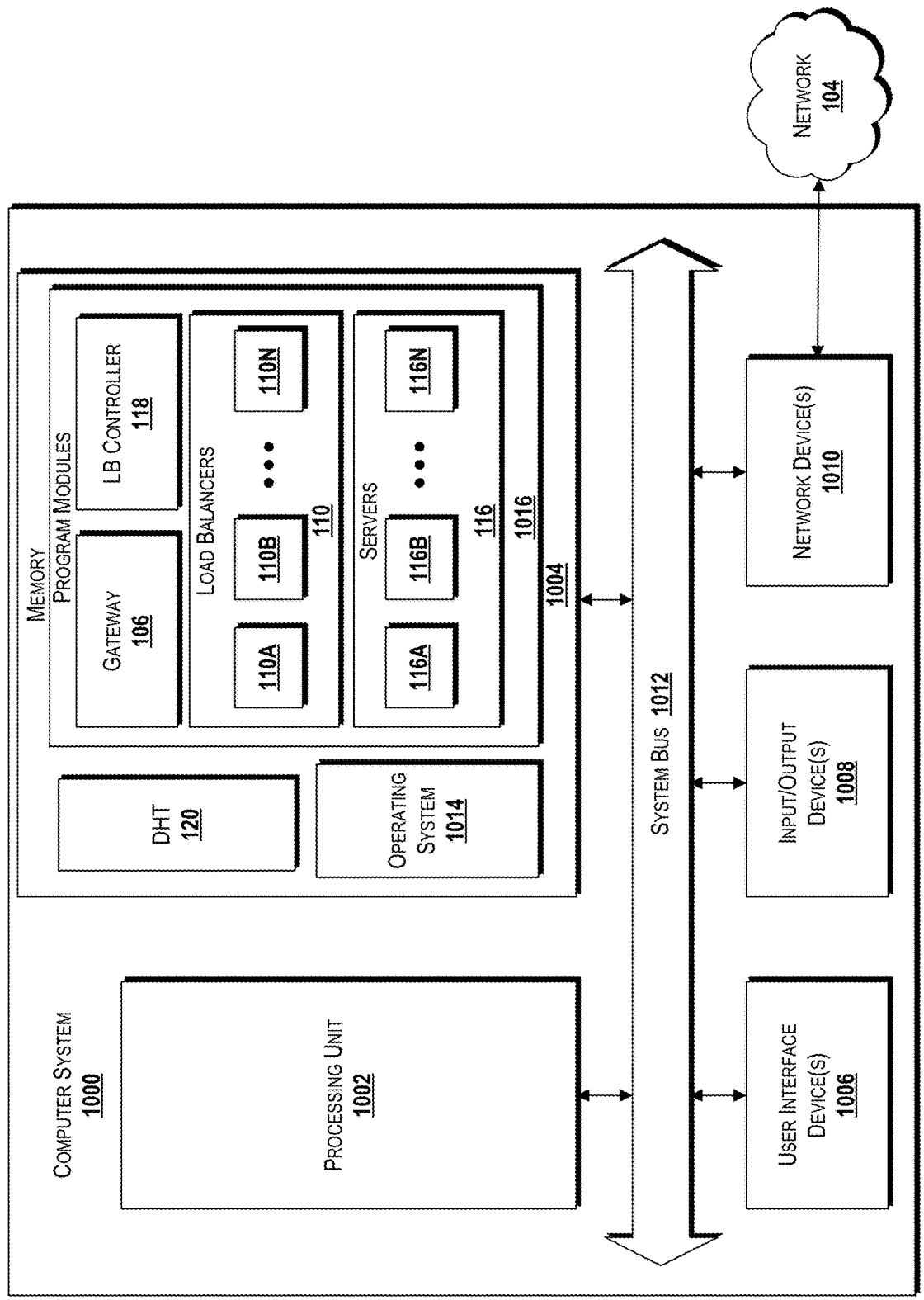
FIG. 10 is a block diagram illustrating an example computer system configured to provide a distributed stateful load balancer, according to some illustrative embodiments of the concepts and technologies described herein.

FIG. 10 is a block diagram illustrating a computer system 1000 configured to provide the functionality described herein for a distributed stateful load balancer, in accordance with various embodiments of the concepts and technologies disclosed herein. The computer system 1000 includes a processing unit 1002, a memory 1004, one or more user interface devices 1006, one or more input/output ("I/O") devices 1008, and one or more network devices 1010, each of which is operatively connected to a system bus 1012. The bus 1012 enables bi-directional communication between the processing unit 1002, the memory 1004, the user interface devices 1006, the I/O devices 1008, and the network devices 1010.

The processing unit 1002 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 1004 communicates with the processing unit 1002 via the system bus 1012. In some embodiments, the memory 1004 is operatively connected to a memory controller (not shown) that enables communication with the processing unit 1002 via the system bus 1012. The memory 1004 includes an operating system 1014 and one or more program modules 1016. The operating system 1014 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 1016 may include various software and/or program modules described herein. In some embodiments, for example, the program modules 1016 include the gateway 106, the load balancers 110, the servers 116, the load balancer controller 118, and the gateway/load balancer 128. These and/or other modules and/or programs can be embodied in computer-readable media containing instructions that, when executed by the processing unit 1002, perform one or more of the methods 200, 300, 400, 500, 600, 700 described in detail above with respect to FIGS. 2-7 and/or other functionality as illustrated and described herein. It can be appreciated that, at least by virtue of the instructions embodying the methods 200, 300, 400, 500, 600, 700 and/or other functionality illustrated and described herein being stored in the memory 1004 and/or accessed and/or executed by the processing unit 1002, the computer system 1000 is a special-purpose computing system that can facilitate providing the functionality illustrated and described herein. According to embodiments, the program modules 1016 may be embodied in hardware, software, firmware, or any combination thereof. Although not shown in FIG. 10, it should be understood that the memory 1004 also can be configured to store packets 108, hash values, the caches 112 and/or data associated therewith, one or more of the distributed hash table portions 114, queries and/or responses, state transfer commands, and/or other data, if desired.

By way of example, and not limitation, computer-readable media may include any available computer storage media or communication media that can be accessed by the computer system 1000. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1000. In the claims, the phrase "computer storage medium" and variations thereof does not include waves or signals per se and/or communication media.

The user interface devices 1006 may include one or more devices with which a user accesses the computer system 1000. The user interface devices 1006 may include, but are not limited to, computers, servers, personal digital assistants, cellular phones, or any suitable computing devices. The I/O devices 1008 enable a user to interface with the program modules 1016. In one embodiment, the I/O devices 1008 are operatively connected to an I/O controller (not shown) that enables communication with the processing unit 1002 via the system bus 1012. The I/O devices 1008 may include one or more input devices, such as, but not limited to, a keyboard, a mouse, or an electronic stylus. Further, the I/O devices 1008 may include one or more output devices, such as, but not limited to, a display screen or a printer.

The network devices 1010 enable the computer system 1000 to communicate with other networks or remote systems via a network, such as the network 104. Examples of the network devices 1010 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 11:
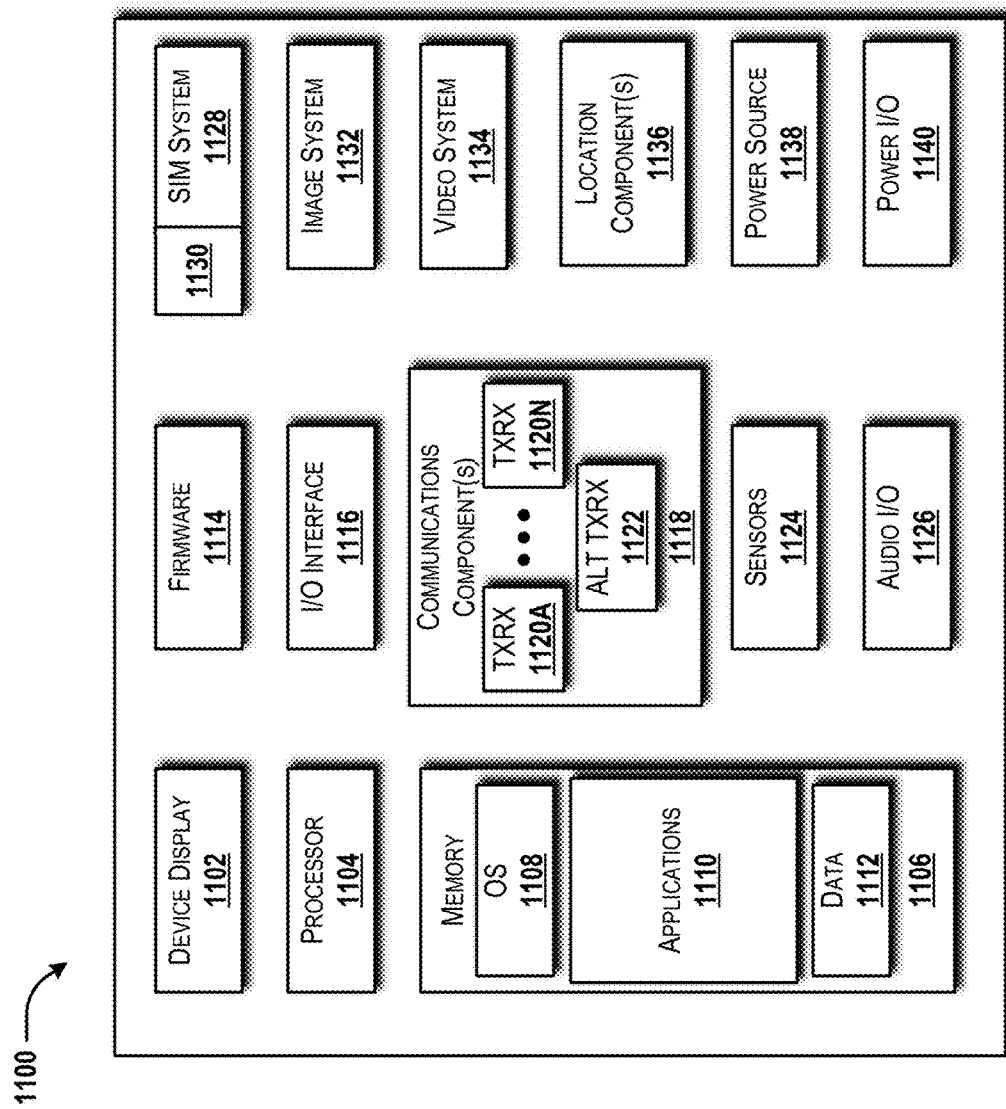
FIG. 11 is a block diagram illustrating an example mobile device, according to an illustrative embodiment.

Turning now to FIG. 11, an illustrative mobile device 1100 and components thereof will be described. While connections are not shown between the various components illustrated in FIG. 11, it should be understood that some, none, or all of the components illustrated in FIG. 11 can be configured to interact with one other to carry out various device functions. In some embodiments, the components are arranged so as to communicate via one or more busses (not shown). Thus, it should be understood that FIG. 11 and the following description are intended to provide a general understanding of a suitable environment in which various aspects of embodiments can be implemented, and should not be construed as being limiting in any way.

As illustrated in FIG. 11, the mobile device 1100 can include a device display 1102 for displaying data. According to various embodiments, the device display 1102 can be configured to display any information. The mobile device 1100 also can include a processor 1104 and a memory or other data storage device ("memory") 1106. The processor 1104 can be configured to process data and/or can execute computer-executable instructions stored in the memory 1106. The computer-executable instructions executed by the processor 1104 can include, for example, an operating system 1108, one or more applications 1110, other computer-executable instructions stored in the memory 1106, or the like. In some embodiments, the applications 1110 also can include a UI application (not illustrated in FIG. 11).

The UI application can interface with the operating system 1108 to facilitate user interaction with functionality and/or data stored at the mobile device 1100 and/or stored elsewhere. In some embodiments, the operating system 1108 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 1104 to aid a user in interacting with data. The UI application can be executed by the processor 1104 to aid a user in answering/initiating calls, entering/deleting other data, entering and setting user IDs and passwords for device access, configuring settings, manipulating address book content and/or settings, multimode interaction, interacting with other applications 1110, and otherwise facilitating user interaction with the operating system 1108, the applications 1110, and/or other types or instances of data 1112 that can be stored at the mobile device 1100.

According to various embodiments, the applications 1110 can include, for example, a web browser application, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 1110, the data 1112, and/or portions thereof can be stored in the memory 1106 and/or in a firmware 1114, and can be executed by the processor 1104. The firmware 1114 also can store code for execution during device power up and power down operations. It should be appreciated that the firmware 1114 can be stored in a volatile or non-volatile data storage device including, but not limited to, the memory 1106 and/or a portion thereof.

The mobile device 1100 also can include an input/output ("I/O") interface 1116. The I/O interface 1116 can be configured to support the input/output of data. In some embodiments, the I/O interface 1116 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 1100 can be configured to synchronize with another device to transfer content to and/or from the mobile device 1100. In some embodiments, the mobile device 1100 can be configured to receive updates to one or more of the applications 1110 via the I/O interface 1116, though this is not necessarily the case. In some embodiments, the I/O interface 1116 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1116 may be used for communications between the mobile device 1100 and a network device or local device.

The mobile device 1100 also can include a communications component 1118. The communications component 1118 can be configured to interface with the processor 1104 to facilitate wired and/or wireless communications with one or more networks. In some embodiments, the communications component 1118 includes a multimode communications subsystem for facilitating communications via the cellular network and one or more other networks.

The communications component 1118, in some embodiments, includes one or more transceivers. The one or more transceivers, if included, can be configured to communicate over the same and/or different wireless technology standards with respect to one another. For example, in some embodiments one or more of the transceivers of the communications component 1118 may be configured to communicate using GSM, CDMAONE, CDMA2000, LTE, and various other 2G, 2.5G, 3G, 4G, 5G and greater generation technology standards. Moreover, the communications component 1118 may facilitate communications over various channel access methods (which may or may not be used by the aforementioned standards) including, but not limited to, TDMA, FDMA, W-CDMA, OFDM, SDMA, and the like.

In addition, the communications component 1118 may facilitate data communications using GPRS, EDGE, the HSPA protocol family including HSDPA, EUL or otherwise termed HSUPA, HSPA+, and various other current and future wireless data access standards. In the illustrated embodiment, the communications component 1118 can include a first transceiver ("TxRx") 1120A that can operate in a first communications mode (e.g., GSM). The communications component 1118 also can include an Nth transceiver ("TxRx") 1120N that can operate in a second communications mode relative to the first transceiver 1120A (e.g., UMTS). While two transceivers 1120A-N (hereinafter collectively and/or generically referred to as "transceivers 1120") are shown in FIG. 11, it should be appreciated that less than two, two, or more than two transceivers 1120 can be included in the communications component 1118.

The communications component 1118 also can include an alternative transceiver ("Alt TxRx") 1122 for supporting other types and/or standards of communications. According to various contemplated embodiments, the alternative transceiver 1122 can communicate using various communications technologies such as, for example, WI-FI, WIMAX, BLUETOOTH, BLE, infrared, infrared data association ("IRDA"), near field communications ("NFC"), other RF technologies, combinations thereof, and the like.

In some embodiments, the communications component 1118 also can facilitate reception from terrestrial radio networks, digital satellite radio networks, internet-based radio service networks, combinations thereof, and the like. The communications component 1118 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 1100 also can include one or more sensors 1124. The sensors 1124 can include temperature sensors, light sensors, air quality sensors, movement sensors, orientation sensors, noise sensors, proximity sensors, or the like. As such, it should be understood that the sensors 1124 can include, but are not limited to, accelerometers, magnetometers, gyroscopes, infrared sensors, noise sensors, microphones, combinations thereof, or the like. One or more of the sensors 1124 can be used to detect movement of the mobile device 1100. Additionally, audio capabilities for the mobile device 1100 may be provided by an audio I/O component 1126. The audio I/O component 1126 of the mobile device 1100 can include one or more speakers for the output of audio signals, one or more microphones for the collection and/or input of audio signals, and/or other audio input and/or output devices.

The illustrated mobile device 1100 also can include a subscriber identity module ("SIM") system 1128. The SIM system 1128 can include a universal SIM ("USIM"), a universal integrated circuit card ("UICC") and/or other identity devices. The SIM system 1128 can include and/or can be connected to or inserted into an interface such as a slot interface 1130. In some embodiments, the slot interface 1130 can be configured to accept insertion of other identity cards or modules for accessing various types of networks. Additionally, or alternatively, the slot interface 1130 can be configured to accept multiple subscriber identity cards. Because other devices and/or modules for identifying users and/or the mobile device 1100 are contemplated, it should be understood that these embodiments are illustrative, and should not be construed as being limiting in any way.

The mobile device 1100 also can include an image capture and processing system 1132 ("image system"). The image system 1132 can be configured to capture or otherwise obtain photos, videos, and/or other visual information. As such, the image system 1132 can include cameras, lenses, CCDs, combinations thereof, or the like. The mobile device 1100 may also include a video system 1134. The video system 1134 can be configured to capture, process, record, modify, and/or store video content. Photos and videos obtained using the image system 1132 and the video system 1134, respectively, may be added as message content to an MMS message, email message, and sent to another mobile device. The video and/or photo content also can be shared with other devices via various types of data transfers via wired and/or wireless communication devices as described herein.

The mobile device 1100 also can include one or more location components 1136. The location components 1136 can be configured to send and/or receive signals to determine a specific location of the mobile device 1100. According to various embodiments, the location components 1136 can send and/or receive signals from GPS devices, A-GPS devices, WI-FI/WIMAX and/or cellular network triangulation data, combinations thereof, and the like. The location component 1136 also can be configured to communicate with the communications component 1118 to retrieve triangulation data from the mobile telecommunications network for determining a location of the mobile device 1100. In some embodiments, the location component 1136 can interface with cellular network nodes, telephone lines, satellites, location transmitters and/or beacons, wireless network transmitters and receivers, combinations thereof, and the like. In some embodiments, the location component 1136 can include and/or can communicate with one or more of the sensors 1124 such as a compass, an accelerometer, and/or a gyroscope to determine the orientation of the mobile device 1100. Using the location component 1136, the mobile device 1100 can generate and/or receive data to identify its geographic location, or to transmit data used by other devices to determine the location of the mobile device 1100. The location component 1136 may include multiple components for determining the location and/or orientation of the mobile device 1100.

The illustrated mobile device 1100 also can include a power source 1138. The power source 1138 can include one or more batteries, power supplies, power cells, and/or other power subsystems including alternating current ("AC") and/or direct current ("DC") power devices. The power source 1138 also can interface with an external power system or charging equipment via a power I/O component 1140. Because the mobile device 1100 can include additional and/or alternative components, the above embodiment should be understood as being illustrative of one possible operating environment for various embodiments of the concepts and technologies described herein. The described embodiment of the mobile device 1100 is illustrative, and should not be construed as being limiting in any way.

Figure 12:
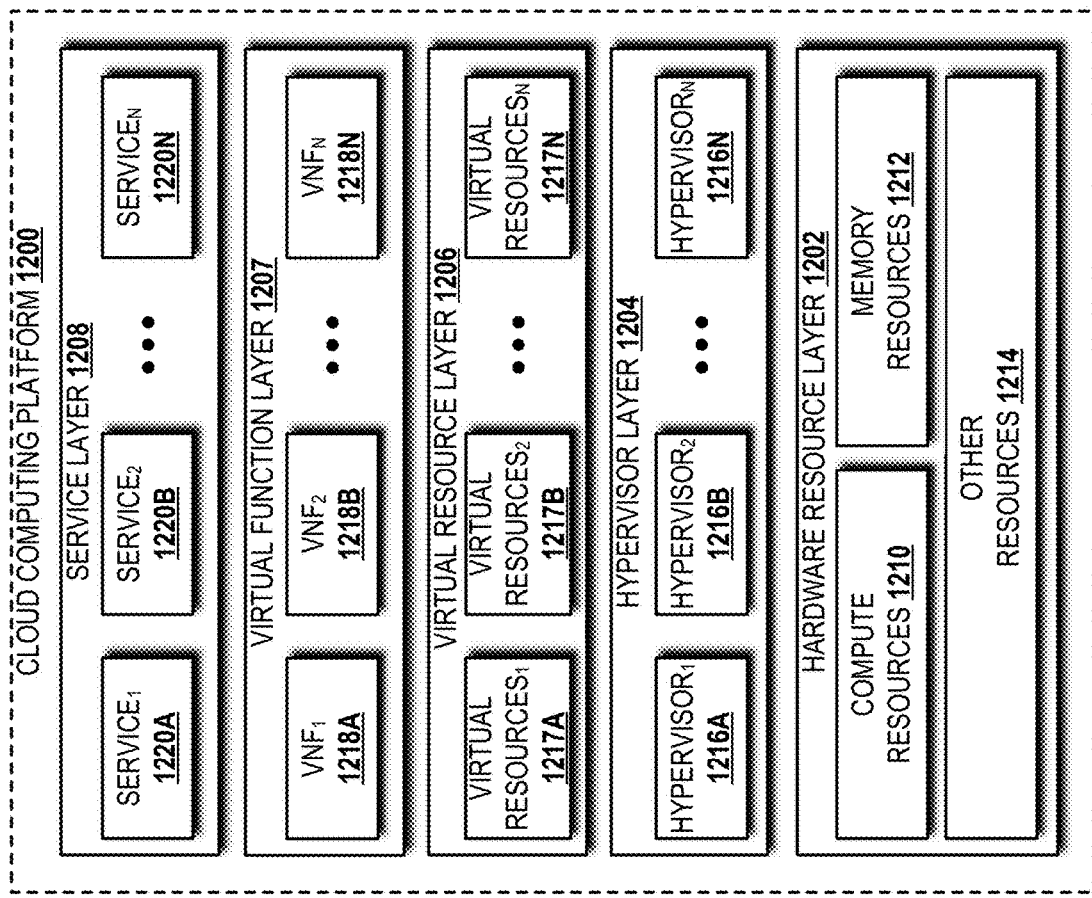
FIG. 12 is a block diagram illustrating a cloud computing platform capable of implementing aspects of the concepts and technologies disclosed herein.

Turning now to FIG. 12, an illustrative cloud computing platform 1200 will be described, according to an illustrative embodiment. The cloud computing platform 1200 includes a hardware resource layer 1202, a hypervisor layer 1204, a virtual resource layer 1206, a virtual function layer 1207, and a service layer 1208. While no connections are shown between the layers illustrated in FIG. 12, it should be understood that some, none, or all of the components illustrated in FIG. 12 can be configured to interact with one other to carry out various functions described herein. In some embodiments, the components are arranged so as to communicate via one or more networks. Thus, it should be understood that FIG. 12 and the remaining description are intended to provide a general understanding of a suitable environment in which various aspects of the embodiments described herein can be implemented and should not be construed as being limiting in any way.

The hardware resource layer 1202 provides hardware resources. In the illustrated embodiment, the hardware resource layer 1202 includes one or more compute resources 1210, one or more memory resources 1212, and one or more other resources 1214. The compute resource(s) 1210 can include one or more hardware components that perform computations to process data and/or to execute computer-executable instructions of one or more application programs, one or more operating systems, and/or other software. In particular, the compute resources 1210 can include one or more central processing units ("CPUs") configured with one or more processing cores. The compute resources 1210 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the compute resources 1210 can include one or more discrete GPUs. In some other embodiments, the compute resources 1210 can include CPU and GPU components that are configured in accordance with a co-processing CPU/GPU computing model, wherein the sequential part of an application executes on the CPU and the computationally-intensive part is accelerated by the GPU processing capabilities. The compute resources 1210 can include one or more system-on-chip ("SoC") components along with one or more other components, including, for example, one or more of the memory resources 1212, and/or one or more of the other resources 1214. In some embodiments, the compute resources 1210 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 1210 can be or can include one or more hardware components architected in accordance with an ARM architecture, available for license from ARM HOLDINGS of Cambridge, United Kingdom. Alternatively, the compute resources 1210 can be or can include one or more hardware components architected in accordance with an x86 architecture, such an architecture available from INTEL CORPORATION of Mountain View, Calif., and others. Those skilled in the art will appreciate the implementation of the compute resources 1210 can utilize various computation architectures, and as such, the compute resources 1210 should not be construed as being limited to any particular computation architecture or combination of computation architectures, including those explicitly disclosed herein.

The memory resource(s) 1212 can include one or more hardware components that perform storage/memory operations, including temporary or permanent storage operations. In some embodiments, the memory resource(s) 1212 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 1210.

The other resource(s) 1214 can include any other hardware resources that can be utilized by the compute resources(s) 1210 and/or the memory resource(s) 1212 to perform operations described herein. The other resource(s) 1214 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 1202 can be virtualized by one or more hypervisors 1216A-1216N (also known as "virtual machine monitors") operating within the hypervisor layer 1204 to create virtual resources that reside in the virtual resource layer 1206. The hypervisors 1216A-1216N can be or can include software, firmware, and/or hardware that alone or in combination with other software, firmware, and/or hardware, creates and manages virtual resources 1217A-1217N operating within the virtual resource layer 1206.

The virtual resources 1217A-1217N operating within the virtual resource layer 1206 can include abstractions of at least a portion of the compute resources 1210, the memory resources 1212, and/or the other resources 1214, or any combination thereof. In some embodiments, the abstractions can include one or more virtual machines, virtual volumes, virtual networks, and/or other virtualizes resources upon which one or more VNFs 1218A-1218N can be executed. The VNFs 1218A-1218N in the virtual function layer 1207 are constructed out of the virtual resources 1217A-1217N in the virtual resource layer 1206. In the illustrated example, the VNFs 1218A-1218N can provide, at least in part, one or more services 1220A-1220N in the service layer 1208.

Based on the foregoing, it should be appreciated that systems and methods for extending distributed hash table-based software network functions to switching hardware have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:
a set of node peers, wherein a first subset of the set of node peers is implemented in software and a second subset of the set of node peers is implemented in hardware;
the first subset comprises a software node comprising a first portion of a distributed hash table and a software cache;
the second subset comprises a hardware node comprising a hardware cache, a processor, and a memory that stores computer-executable instructions that, when executed by the processor, cause the processor to perform operations comprising
receiving, from a network, a packet,
determining if data that identifies a path associated with the packet is stored in the hardware cache,
in response to determining that the data that identifies the path associated with the packet is not stored in the hardware cache, querying the software node to identify the path associated with the packet,
receiving, from the software node, the data that identifies the path,
storing, in the hardware cache, the data that identifies the path,
forwarding, along the path, the packet to a network element,
associating the data that identifies the path with a timeout value,
starting a timer,
determining if the timer has reached the timeout value, and
in response to determining that the timer has reached the timeout value, deleting, from the hardware cache, the data that identifies the path.

2. The system of claim 1, wherein the computer-executable instructions, when executed by the processor, cause the processor to perform operations further comprising:
receiving, from the network, a subsequent packet;
determining, based on the hardware cache, the path associated with the subsequent packet; and
forwarding the subsequent packet directly to the network element, and therefore bypassing the first subset of the set of node peers.

3. The system of claim 1, wherein the computer-executable instructions, when executed by the processor, cause the processor to perform operations further comprising:
receiving, from the network element, a subsequent packet on a reverse path, wherein the network element sends the subsequent packet in response to the packet; and
forwarding the subsequent packet to the network.

4. The system of claim 1, wherein the software node comprises a software load balancer; and wherein the hardware node comprises a hardware load balancer and a gateway.

5. The system of claim 1, wherein the first subset of the set of node peers comprises a further software node comprising a second portion of the distributed hash table and a further software cache.

6. The system of claim 1, wherein the second subset of the set of node peers comprises a further hardware node comprising a further hardware cache.

7. The system of claim 1, wherein the computer-executable instructions, when executed by the processor, cause the processor to perform operations further comprising:
receiving further data that identifies a further path;
determining if the hardware cache is full; and
in response to determining that the hardware cache is full, evicting the data from the hardware cache to allow storage of the further data.

8. A method comprising:
receiving, by a hardware node comprising a hardware cache and a processor, from a network, a packet, wherein the hardware node is part of a set of node peers comprising a first subset and a second subset, and wherein the first subset of the set of node peers is implemented in software and comprises a software node and the second subset of the set of node peers is implemented in hardware and comprises the hardware node;
determining, by the hardware node, if data that identifies a path associated with the packet is stored in the hardware cache;
in response to determining that the data that identifies the path associated with the packet is not stored in the hardware cache, querying, by the hardware node, the software node to identify the path associated with the packet;
receiving, by the hardware node, from the software node, the data that identifies the path;
storing, by the hardware node, in the hardware cache, the data that identifies the path;

forwarding, by the hardware node, along the path, the packet to a network element;
associating, by the hardware node, the data that identifies the path with a timeout value;
starting, by the hardware node, a timer;
determining, by the hardware node, if the timer has reached the timeout value; and
in response to determining that the timer has reached the timeout value, deleting, by the hardware node, from the hardware cache, the data that identifies the path.

9. The method of claim 8, further comprising:
receiving, by the hardware node, from the network, a subsequent packet;
determining, by the hardware node, based on the hardware cache, the path associated with the subsequent packet; and
forwarding, by the hardware node, the subsequent packet directly to the network element, and therefore bypassing the first subset of the set of node peers.

10. The method of claim 8, further comprising:
receiving, from the network element, a subsequent packet on a reverse path, wherein the network element sends the subsequent packet in response to the packet; and
forwarding the subsequent packet to the network.

11. The method of claim 8, wherein the software node comprises a software load balancer; and wherein the hardware node comprises a hardware load balancer and a gateway.

12. The method of claim 8, wherein the software node comprises a first portion of a distributed hash table and a software cache; and wherein the first subset of the set of node peers comprises a further software node comprising a second portion of the distributed hash table and a further software cache.

13. The method of claim 8, wherein the second subset of the set of node peers comprises a further hardware node comprising a further hardware cache.

14. The method of claim 8, further comprising:
receiving, by the hardware node, further data that identifies a further path;
determining, by the hardware node, if the hardware cache is full; and
in response to determining that the hardware cache is full, evicting, by the hardware node, the data from the hardware cache to allow storage of the further data.

15. A computer storage medium having computer-executable instructions stored thereon that, when executed by a processor of a hardware node comprising a hardware cache, cause the processor of the hardware node to perform operations, wherein the hardware node is part of a set of node peers comprising a first subset and a second subset, wherein the first subset of the set of node peers is implemented in software and comprises a software node and the second subset of the set of node peers is implemented in hardware and comprises the hardware node, and wherein the operations comprise:
receiving, from a network, a packet;
determining if data that identifies a path associated with the packet is stored in the hardware cache;
in response to determining that the data that identifies the path associated with the packet is not stored in the hardware cache, querying the software node to identify the path associated with the packet;
receiving, from the software node, the data that identifies the path;
storing, in the hardware cache, the data that identifies the path;
forwarding, along the path, the packet to a network element;
associating the data that identifies the path with a timeout value;
starting a timer;
determining if the timer has reached the timeout value; and
in response to determining that the timer has reached the timeout value, deleting, from the hardware cache, the data that identifies the path.

16. The computer storage medium of claim 15, wherein the computer-executable instructions, when executed by the processor of the hardware node, cause the processor to perform operations further comprising:
receiving, from the network, a subsequent packet;
determining, based on the hardware cache, the path associated with the subsequent packet; and
forwarding the subsequent packet directly to the network element, and therefore bypassing the first subset of the set of node peers.

17. The computer storage medium of claim 15, wherein the computer-executable instructions, when executed by the processor of the hardware node, cause the processor to perform operations further comprising:
receiving further data that identifies a further path;
determining if the hardware cache is full; and
in response to determining that the hardware cache is full, evicting the data from the hardware cache to allow storage of the further data.

* * * * *